(12) United States Patent  (10) Patent No.: US 8,562,892 B2
Mason  (45) Date of Patent: Oct. 22, 2013

(54) MECHANICAL PROCESS FOR PRODUCING PARTICLES IN A FLUID

(75) Inventor: Thomas G. Mason, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 951 days.

(21) Appl. No.: 12/579,226

(22) Filed: Oct. 14, 2009

(65) Prior Publication Data

US 2010/0090161 A1    Apr. 15, 2010

Related U.S. Application Data

(60) Provisional application No. 61/105,232, filed on Oct. 14, 2008.

(51) Int. Cl.
    *B29B 9/00* (2006.01)
(52) U.S. Cl.
    USPC ..................................................... 264/297.8
(58) Field of Classification Search
    None
    See application file for complete search history.

(56) References Cited

U.S. PATENT DOCUMENTS

| 6,284,345 | B1* | 9/2001 | Ruoff .............................. 428/143 |
| 2004/0053146 | A1* | 3/2004 | Sreenivasan et al. ........... 430/22 |
| 2004/0175843 | A1* | 9/2004 | Roitman et al. ............... 436/531 |
| 2008/0252988 | A1* | 10/2008 | Tormen et al. ................. 359/652 |
| 2010/0021985 | A1 | 1/2010 | Mason |
| 2010/0035061 | A1 | 2/2010 | Mason et al. |
| 2010/0087352 | A1 | 4/2010 | Mason |
| 2011/0049096 | A1* | 3/2011 | Sreenivasan et al. ........... 216/40 |

OTHER PUBLICATIONS

Chou et al., "Nanoimprint lithography," J. Vacuum Sci. Tech. B 1996, 14 (6), 4129-4133.
Chou et al., "Nanoimprint lithography and lithographically induced self-assembly," MRS Bulletin 2001, 26, 512.
Hernandez et al., "Pillar-deposition particle templating: A high-throughput synthetic route for producing LithoParticles," Soft Materials 2007, 5, 1-11.
Hernandez et al., "Colloidal alphabet soup: Monodisperse dispersions of shape-designed LithoParticles," J. Phys. Chem. C, 2007, 111, 4477-4480.

(Continued)

*Primary Examiner* — Mary F Theisen
(74) *Attorney, Agent, or Firm* — Venable LLP; Henry J. Daley

(57) ABSTRACT

A method for producing particles includes providing a first patterned surface having a first surface relief pattern adapted to impart structure to a plurality of particles while they are under production; providing a second patterned surface having a second surface relief pattern adapted to impart structure to a plurality of particles while they are under production; depositing a particle material in contact with at least one of the first patterned surface and the second patterned surface; aligning the first surface relief pattern on the first patterned surface with respect to the second surface relief pattern on the second patterned surface; contacting at least a portion of the first patterned surface with at least a portion of the second patterned surface; solidifying at least a portion of the particle material to form a plurality of particles; and separating at least a portion of the plurality of particles from at least one of the first patterned surface and the second patterned surface. The at least a portion of a structure of each of the plurality of particles is imparted by a combination of the first surface relief pattern and the second surface relief pattern.

22 Claims, 19 Drawing Sheets

(56) References Cited

OTHER PUBLICATIONS

Hernandez et al., "Well-deposition particle templating: Rapid mass-production of LithoParticles without mechanical imprinting," Soft Materials 2007, 5, 13-31.

Resnick et al., "Improved step and flash imprint lithography templates for nanofabrication," Microelectronic Engineering 2003, 69, 412-419.

Rolland et al, "Direct fabrication of monodisperse shape-specific nanobiomaterials through imprinting," J. Am. Chem. Soc. 2005, 127, 10096-10100.

* cited by examiner

MECHANICAL PROCESS FOR PRODUCING PARTICLES IN A FLUID

CROSS-REFERENCE TO RELATED APPLICATION

This application claims priority to U.S. Provisional Application No. 61/105,232 filed Oct. 14, 2008, the entire content of which is hereby incorporated by reference.

FEDERAL FUNDING

This invention was made using U.S. Government support under NSF CAREER Grant No. CHE-0450022. The U.S. Government has certain rights in this invention.

BACKGROUND

1. Field of Invention

This application relates to processes and systems for making particles, and more particularly processes and systems for making particles having a dimension less than about 1 mm and particles and compositions containing the particles.

2. Discussion of Related Art

The contents of all references, including articles, published patent applications and patents referred to anywhere in this specification are hereby incorporated by reference.

Sub-millimeter particles having custom-designed shapes are highly desirable for a broad range of applications, including making controlled assemblies. However, some existing methods for making custom-shaped particles rely upon a lithographic process (Madou, M. J. *Fundamentals of microfabrication: The science of miniaturization.* 2nd ed.; CRC Press: Boca Raton, 2002). Typically, these methods require exposing a radiation-sensitive material that has been deposited on a substrate to spatially patterned radiation without degrading the substrate (see e.g. Hernandez, C. J.; Mason, T. G. Colloidal alphabet soup: Monodisperse dispersions of shape-designed LithoParticles. J. Phys. Chem. C, 2007, 111, 4477-4480). (Shape-designed particles, regardless of the methods of production, will also be referred to as LithoParticles in this specification.) In a basic implementation, a polymer resist layer can be cross-linked by the optical exposure and, after development, the polymer resist particles can be released from the substrate (see U.S. application Ser. No. 12/377,773 filed Feb. 17, 2009 as a national stage application of PCT/US07/18365, entitled "Customized Lithographic Particles," by the same assignee as the current application, the entire contents of which are hereby incorporated by reference). In some cases, the lithographic device that produces the spatially patterned radiation is very expensive to purchase and maintain. Therefore, developing a method of producing sub-millimeter particles without having to rely upon a complex exposure system to make repeated exposures in order to mass-produce sub-millimeter particles is highly desirable.

One method of producing particles that does not involve mechanical imprinting is relief deposition templating. In this method, a patterned relief surface is created on a solid substrate, and a deposition of a particle material is made in a manner that creates discrete regions that can be separated from the template and retain a geometrical feature imparted by the template. Two implementations of this are pillar deposition templating (Hernandez, C. J.; Zhao, K.; Mason, T. G. Pillar-deposition particle templating: A high-throughput synthetic route for producing LithoParticles (Soft Materials 2007, 5, 1-11)) in which the particles are formed on the top surfaces of pillars (i.e. relief projections), and well deposition templating (Hernandez, C. J.; Zhao, K.; Mason, T. G. Well-deposition particle templating: Rapid mass-production of LithoParticles without mechanical imprinting (Soft Materials 2007, 5, 13-31)), in which the particles are formed by wells (i.e. relief depressions) in the template. Relief deposition templating (U.S. application Ser. No. 12/563,907 titled "Mechanical Process for Creating Particles in a Fluid" filed Sep. 21, 2009 as a CIP of PCT/U.S.08/03679) offers several advantages over mechanical imprinting, since a deposition of a particle material onto a single patterned surface to produce particles is typically much simpler than using a more complex mechanical imprinting device (see e.g. Chou, S. Y. Nanoimprint lithography and lithographically induced self assembly. MRS Bulletin 2001, 26, 512; Chou, S. Y.; Krauss, P. R.; Renstrom, P. J. Nanoimprint lithography. J. Vacuum Sci. Tech. B 1996, 14 (6), 4129-4133; Resnick, D. J.; Mancini, D.; Dauksher, W. J.; Nordquist, K.; Bailey, T. C.; Johnson, S.; Sreenivasan, S. V.; Ekerdt, J. G.; Willson, C G Improved step and flash imprint lithography templates for nanofabrication. Microelectronic Engineering 2003, 69, 412-419). However, one aspect of the method of relief deposition templating is that typically a portion of the shapes of the particles is not defined by the template, but instead is defined by properties of the particle material and by the method of deposition. This aspect can be an advantage in some cases for certain applications of custom-shaped particles, but it can also be a disadvantage in others for which precise specification of the exact shape of the entire surfaces of the produced particles is desired. Moreover, the range of particle shapes that can be produced using only a single patterned surface is limited. Therefore, it would be highly desirable to develop an alternative method for making a wide variety of particle shapes that overcome these existing limitations.

Mechanical imprinting, whether thermal (see e.g. Chou, S. Y. Nanoimprint lithography and lithographically induced self assembly. MRS Bulletin 2001, 26, 512; Chou, S. Y.; Krauss, P. R.; Renstrom, P. J. Nanoimprint lithography. J. Vacuum Sci. Tech. B 1996, 14 (6), 4129-4133) or step-and-flash (see e.g. Resnick, D. J.; Mancini, D.; Dauksher, W. J.; Nordquist, K.; Bailey, T. C.; Johnson, S.; Sreenivasan, S. V.; Ekerdt, J. G.; Willson, C G Improved step and flash imprint lithography templates for nanofabrication. Microelectronic Engineering 2003, 69, 412-419), is a technology that involves bringing two solid surfaces into contact after depositing a desired material between them. Once the surfaces of the two plates touch, the material only fills trenches or wells in one plate that has been prepared with the desired relief patterns in the surfaces of the plates. Imprinting essentially forces a desired material into void-like regions that have been created in one of the surfaces to form a mold. While the two plates are touching (or nearly touching), a process, such as cross-linking in the case of polymers, can be used to rigidify the material in the mold, and then the plates are separated. During the separation, if the release of the desired material from the corrugated surface can be made efficiently, then the result is a set of raised structures of the desired material on the flat surface of the other plate. Imprinting is a subset of the more general process of embossing, in which a mold is pressed into the surface of a material that is not as rigid and then removed to create raised corrugations that reflect the mold. However, by contrast to embossing, mechanical imprinting involves squeezing out material between two solid plates where they touch, so that only the negative relief corrugations in one plate become filled with the desired material.

Although it is possible to create particles using a single patterned plate imprinting method (see e.g. Rolland, J. P.; Maynor, B. W.; Euliss, L. E.; Exner, A. E.; Denison, G. M.;

DeSimone, J. M. Direct fabrication of monodisperse shape-specific nanobiomaterials through imprinting (J. Am. Chem. Soc. 2005, 127, 10096-10100)), this method lacks the basic capacity to produce a wide variety of particles shapes having topologies that would preclude release of the particle material from the imprinting template. In particular, by practicing the method of Rolland et al., it is not possible to produce the widest possible variety of particle shapes because certain shapes certain shapes that are unsuitable for release from a single patterned plate would become trapped in the patterned plate after the particle material is solidified and therefore could not be subsequently released from the patterned plate. Moreover, Rolland et al. teach only a method of imprinting particles that involves a first patterned plate and a smooth plate, so the relative alignment of the patterned plate relative to the smooth plate is inconsequential and does not affect the shapes of the particles produced. Thus, in the imprinting process described by Rolland et al., the contours of a single patterned plate and a flat smooth plate dictate the shapes of the particles that are produced. Also, the method of Rolland et al. is limited to producing only a subset of all possible shapes because only a limited range of shapes can be released from a single patterned plate after solidification of a particle material. For example, certain particle shapes would get stuck in the depressions in the patterned plate after solidification and could not be easily removed. As another example, it would not be possible to produce and release a spherical particle through the process involving a single patterned plate described by Rolland et al. Moreover, in the single-patterned-plate method of Rolland et al., the shapes of particles produced do not depend on the relative alignment and orientation of the patterned plate and the smooth plate; instead, the shapes of particles produced depend only on the shapes of depressions in the patterned plate. These limitations of the method of Rolland et al. are significant, and there is a need to improve methods of making particles beyond the current art to overcome these inherent limitations.

By contrast to the existing methods of making custom-shaped particles, it would be highly desirable to create a method of making particles for which the shape of the resulting particles is actually controlled in a desired and pre-specified manner by the relative alignment of a first patterned surface with respect to a second patterned surface, as well as by local surface relief features, whether positive or negative in the first and second patterned surfaces.

Another existing method of creating custom-shaped particles is relief radiation templating (U.S. application Ser. No. 12/575,920 titled "Process for Creating Shape-Designed Particles in a Fluid" filed Oct. 8, 2009). In this method, the shape of the particle is designed and formed by a combination of patterned surface relief features on a relief template and exposure to spatially patterned radiation. This combination provides shape-designed particles that can have more complex shapes than simple relief deposition templating, at the cost of requiring repeated use of the lithographic exposure system. In the relief radiation templating method, as with the relief deposition templating method, a portion of the shape of the particle may result from a deposition process and may not be pre-specified by either the patterned surface relief features or by the spatially patterned radiation. The precision of certain surface features on particles that can be obtained by certain deposition processes may not be suitable for certain applications of custom-shaped particles.

Consequently, there remains a need for improved processes and systems for making shape-designed particles having a dimension less than about 1 mm.

SUMMARY

A method for producing particles according to an embodiment of the current invention includes providing a first patterned surface having a first surface relief pattern adapted to impart structure to a plurality of particles while they are under production; providing a second patterned surface having a second surface relief pattern adapted to impart structure to a plurality of particles while they are under production; depositing a particle material in contact with at least one of said first patterned surface and said second patterned surface; aligning said first surface relief pattern on said first patterned surface with respect to said second surface relief pattern on said second patterned surface; contacting at least a portion of said first patterned surface with at least a portion of said second patterned surface; solidifying at least a portion of said particle material to form a plurality of particles; and separating at least a portion of said plurality of particles from at least one of said first patterned surface and said second patterned surface. At least a portion of a structure of each of said plurality of particles is imparted by a combination of said first surface relief pattern and said second surface relief pattern.

A multi-component composition according to some embodiments of the current invention includes a first material component in which particles can be dispersed, and a plurality of particles dispersed in the first material component. The plurality of particles is produced by methods according to embodiments of the current invention and the plurality of particles is at least 1,000 particles produced in a parallel process.

A system for manufacturing particles includes a patterned surface cleaning and preparation system; a deposition system arranged proximate said patterned surface cleaning and preparation system to be able to receive a first patterned surface and a second patterned surface from said patterned surface cleaning and preparation system upon which a particle material will be deposited to produce said particles; and an alignment contacting system arranged proximate said deposition system to be able to receive a first patterned surface and a second patterned surface upon which said particle material has been deposited from said deposition system through which a first patterned surface will be aligned with respect to a second patterned surface and through which at least a portion of a first patterned surface will be contacted with at least a portion of a second patterned surface to produce said particles; and a particle separating system arranged proximate said alignment contacting system to be able to receive a first patterned surface, a second patterned surface, and said particle material that has been structured between said first patterned surface and said second patterned surface from said alignment contacting system through which at least a portion of said particle material is separated as discrete particles from at least one of said first patterned surface and said second patterned surface. Said first patterned surface has a first surface relief pattern structured to impart at least a portion of a structure to each of said plurality of particles, said second patterned surface has a second surface relief pattern structured to impart at least a portion of a structure to each of said plurality of particles, and said first patterned surface is aligned with respect to said second patterned surface to impart at least a portion of a structure to each of said plurality of particles.

BRIEF DESCRIPTION OF THE DRAWINGS

The invention is better understood by reading the following detailed description with reference to the accompanying figures in which.

DETAILED DESCRIPTION

Figure 1A:
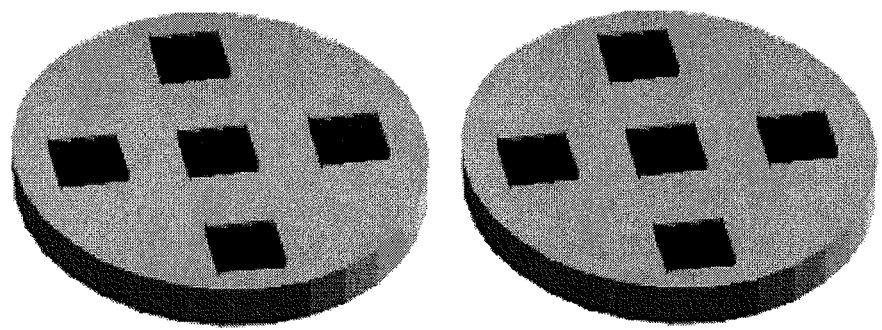
FIG. 1(a) is a schematic illustration of a first patterned surface and a second patterned surface suitable for use in aligned patterned surfaces particle imprinting (APSPI) for making custom-shaped particles (i.e. LithoParticles), according to an embodiment of the current invention. Flat polished surfaces of two silicon wafers have been patterned lithographically using an etching process to create a first patterned surface that contains a square array of a plurality of square wells and a second patterned surface that contains a square array of a plurality of square wells, as schematically shown. As shown, the two-dimensional lattice basis vectors associated with the arrays on each of the patterned surfaces are identical. The geometrical features (i.e. array of dark square-shaped wells) in each of the patterned surfaces have been designed to impart a desired morphology to the surfaces of particles to be made by imprinting using the patterned surfaces. Note that the lateral dimensions and depth of the wells are typically sub-millimeter (i.e. not shown to scale relative to the size of a typical silicon wafer), and can be as small as microscale or nanoscale, depending upon the size of the desired particles.

In describing embodiments of the present invention illustrated in the drawings, specific terminology is employed for the sake of clarity. However, the invention is not intended to be limited to the specific terminology so selected. It is to be understood that each specific element includes all technical equivalents which operate in a similar manner to accomplish a similar purpose.

Some embodiments of the current invention provide methods for producing microscopic and/or submicroscopic particles. The methods according to some embodiments of the current invention include designing, fabricating, and providing a first patterned surface that has a first plurality of discrete surface portions (e.g. local geometrical surface relief features), each discrete surface portion having a surface geometry selected to impart a desired geometrical property to a particle while being produced. The methods according to some embodiments of the current invention include designing, fabricating, and providing a second patterned surface that has a second plurality of discrete surface portions (e.g. local geometrical surface relief features), and at least a portion of the second plurality of discrete surface portions have a surface geometry selected to impart a desired geometrical property to a particle while being produced. Each of the discrete surface portions can be, but are not limited to, a flat surface, a curved surface, a complex contoured surface, a surface with a plurality of subsurface regions, wells, pillars, positive relief features, negative relief features, or any combination thereof. In some embodiments, a continuous surface-contact region (e.g. a flat smooth surface region) exists on the surface outside the discrete surface portions that have local surface relief features. Herein, microscopic refers to the range of length scales equal to and greater than one micrometer, including length scales ranging up to about one millimeter. Herein, submicroscopic refers to the range of length scales below one micrometer, including length scales ranging down to about one nanometer.

The methods according to some embodiments of the current invention also include depositing a particle material (i.e. constituent material) of said at least one of microscopic and submicroscopic particles being produced onto said plurality of discrete surface portions of at least one of a first patterned surface and a second patterned surface to form at least portions of said particles. A particle material is a material in the composition of the particles being manufactured. The broad concepts of the current invention are not limited to any specific constituent materials. There is an extremely broad range of materials including organic, inorganic, composite, multicomponent and any combination thereof that could be used in various embodiments of the current invention. The depositing can be a directional deposition in some embodiments of the current invention that, for example, leaves at least a fraction of wall portions around the discrete surface portions uncoated by the constituent material. The depositing can include spin-coating, spray-coating, dip-coating, injecting, flowing, brush-coating, sputtering, chemical vapor deposition, physical vapor deposition, molecular beam epitaxy, electron-beam metal deposition, or any combination thereof in some embodiments of the current invention.

The methods according to some embodiments of the current invention further include separating at least one particle from at least one of a first patterned surface and a second patterned surface through which the particle separated has the particle material in its composition. The particle may be separated into a fluid material, for example, into a liquid, in some embodiments of the current invention. In other embodiments of the current invention, the fluid material is a gas, a supercritical fluid, a dispersion, an emulsion, a thermotropic liquid crystal, a lyotropic liquid crystal, a ferrofluid, or a solution of soluble molecules in a liquid solvent. In some embodiments there may be one or more particles separated from the patterned surfaces, but in other embodiments, there can be a very large number of particles separated in the same separation step. For example, in some embodiments there could be hundreds of thousands, millions and even billions or more particles separated from the patterned surfaces in the same step.

The methods according to some embodiments of the current invention further include processing the first and second patterned surfaces for subsequent use in producing additional particles. Once the first patterned surface and second patterned surfaces are processed for subsequent use, the above-noted depositing and separating steps can be repeated to produce additional particles. The first and second patterned surfaces may be reprocessed many times according to some embodiments of the invention to mass produce, in assembly-line fashion, very large numbers of the particles.

According to some embodiments of the current invention, at least a portion of a particle's surface has been imparted by a combination of a local geometrical surface relief feature on the first patterned surface, a local geometrical surface relief feature on the second patterned surface, and the relative alignment of a local geometrical surface relief feature on the first patterned surface with respect to a local geometrical surface relief feature on the second patterned surface. In some embodiments of the current invention, because selecting a relative alignment of a first patterned surface with respect to a second patterned surface can influence the shape of a particle, a first patterned surface and a second patterned surface can be used repeatedly in different states of relative alignment to produce a very wide variety of differently shaped particles. Furthermore, in some embodiments of the current invention, separating a first patterned surface from a second patterned surface facilitates release of particles that would otherwise remain trapped between or on the first and second patterned surfaces.

Aligned Pattern Templating (APT)

An embodiment of the current invention provides a method of fabricating a plurality of microscopic or nanoscopic particles using an approach that we call Aligned Particle Templating (APT). In some embodiments of the current invention, particles produced using APT have a shape, or even a plurality of shapes, that are dictated by a combination of a first set of geometrical features that have been designed into the surface topology of a first patterned surface, a second set of geometrical features that have been designed into the surface topology of a second patterned surface, and the relative alignment of the first patterned surface with respect to the second patterned surface. In some embodiments of the current invention, the APT process can create a plurality of discrete islands of solid particle material having the desired particle shape between the first patterned surface and the second patterned surface. The particles that are formed can have a maximum spatial dimension that is less than one millimeter. The particles that are formed also can possess microscale and nanoscale geometrical features, and these particles can be released into a fluid material. In some embodiments of the current invention, the fluid material contains a stabilizing agent (e.g. surfactant or polymer) that inhibits aggregation or agglomeration of the particles after release.

In an embodiment of the current invention, a first patterned surface is designed to impart at least a portion of a shape or shapes of the desired particles, and a second patterned surface is designed to impart at least a portion of a shape or shapes of the desired particles. In some embodiments of the current invention, a patterned surface can be fabricated lithographically using standard methods, such as by etching the surface of a solid polished substrate such as a silicon wafer. In some embodiments of the current invention, it is desirable to fabricate a patterned surface that contains an array of a same local geometrical relief features (e.g. wells) so that the array of local geometrical relief features has a well-defined periodicity, typically along two different spatial directions parallel to the template's surface. For example, in some embodiments of the current invention, a set of two-dimensional basis lattice vectors that can be used to describe an array on a flat surface could define the center-to-center spacing between neighboring local geometrical relief features.

Optionally, in some embodiments of the current invention, in order to facilitate subsequent release of the particles from at least one of a first patterned surface and a second patterned surface in the process, a permanent or a temporary sacrificial release layer of material can be deposited onto at least a portion of one of a first patterned surface and a second patterned surface.

In some embodiments of the current invention, the a first patterned surface is at least partially coated with a radiation-sensitive material, such as a photoresist, that can be significantly altered and affected through a photochemical or photophysical process as a result of exposure to at least one form of radiation. Examples of affecting a radiation-sensitive material include crosslinking a photoresist (e.g. SU-8 photoresist exposed to ultraviolet light) or degrading a polymeric material (e.g. poly-methylmethacrylate or PMMA exposed to an electron-beam). In some embodiments of the current invention, at least a portion of the surface of each particle is imparted by at least a portion of the patterning of a radiation-blocking material on at least one of a first patterned surface and a second patterned surface. In other embodiments of the current invention, at least one of a first patterned surface and a second patterned surface is substantially transparent to a form of radiation that can be used to cause a solidification of a particle material. In other embodiments of the current invention, at least one of a first patterned surface and a second patterned surface is substantially transparent to a form of radiation that can be used to cause a degradation of a particle material. In some embodiments of the current invention, organic, inorganic, metallic, semiconducting materials or a combination thereof can be used as a radiation-sensitive material.

In some embodiments of the current invention, local geometrical features on a patterned surface are etched into a substrate. In some embodiments, a substrate is a solid material that has at least one surface that is flat and polished; examples include a silicon wafer, a quartz wafer, a quartz plate, a metal plate, and a sapphire wafer. Alternatively, in an embodiment of the current invention, the first patterned surface can be formed by a deposition and patterning process, such as growing or depositing a silicon dioxide layer on the surface of a silicon wafer and etching the silicon dioxide layer. A substrate is typically thick enough and solid enough to provide facile manipulation of a patterned surface in a manner that is suitable for deposition, alignment, and release steps, according to some embodiments of the current invention. Since some particle materials can be deposited in the form of a liquid solution, it can be beneficial to heat or bake patterned surfaces after deposition of a particle material in order to drive off any liquid solvent that may be present, and thereby create a solid layer of radiation-sensitive material, according to some embodiments of the current invention.

In several embodiments of the current invention, we illustrate the process for preparing many replicates of particles that all have the same shape. In other embodiments, with similar efficiency and shape-specificity, the APT process can also be used to produce a plurality of particles that have a variety of different shapes.

In some embodiments of the current invention, multiple deposition steps using a variety of particle materials can be performed to make complex custom-shaped particles that have layers of materials, including organic materials, inorganic material, metallic materials, alloys, and biomaterials. In some embodiments of the current invention, it is possible to design and fabricate a first patterned surface and a second patterned surface and align them in a manner to provide local patches or particle sub-structures that can create desired and pre-specified particle-particle interactions, whether attractive or repulsive, after the release of particles into a fluid material.

In some embodiments of the current invention, the solidification of particle material can involve at least one of a depositing a liquid dispersion and then inducing a chemical reaction, a depositing a liquid solution and then inducing a chemical reaction, a thermal polymerization of a polymer component, a photo-induced polymerization, a plasma-induced polymerization, a sintering, a crosslinking reaction, a gelation, an evaporation of a solvent, an aggregation or agglomeration of materials, a jamming, an entanglement, a denaturation, an expansion, a compression, a coalescence, a mixing, a curing, and a bonding.

In some embodiments of the current invention, a particle material deposited onto a patterned surface can be at least one of a vapor, a liquid, a viscoelastic material, and a solution. According to an embodiment of the current invention, a maximum dimension associated with any extra additive components (e.g. molecules or particles) contained within the particle material is typically smaller than the maximum dimension associated with the portion of the surface for creating the particles. In some embodiments of the current invention, it is desirable to disperse nanoparticles as an additive component in a particle material prior to deposition of the particle material so that the resulting custom-shaped particles contain dispersed nanoparticles.

In some embodiments of the current invention, a patterned surface can be produced from a flat smooth substrate by a lithographic process involving at least one of electron-beam lithography, optical lithography, ultraviolet lithography, dip-pen lithography, x-ray lithography, imprinting, stamping, deposition, patterning, and etching, for example.

In some embodiments of the current invention, a particle or a plurality of particles is produced by choosing a desired relative position and orientation of a first patterned surface and a second patterned surface, bringing the first and second patterned surfaces into close proximity resembling contact, and solidifying a particle material viscous, viscoelastic, or viscoplastic particle material that have filled void-like regions formed between the first and second patterned surfaces as a result of bringing the first and second patterned surfaces into close proximity (i.e. contact). For instance, in some embodiments, by precisely controlling the relative alignment and orientation of two patterned plates, each of which contains an array of depressions centered on the same repeating lattice, and causing an particle material to fill the void-like regions between the two plates and to solidify when the two plates are pressed together, a plurality of discrete particles having a variety of shapes can be produced, including some shapes for which a single-patterned-plate method cannot be used. In some embodiments of the current invention, alignment consists of controlling both relative positions and relative orientations of geometrical relief features on a first patterned surface with respect to geometrical relief features on a second patterned surface.

In some embodiments of the current invention, it can be desirable to pattern and etch two solid flat smooth plates lithographically in order to create a regular and uniform lattice of local geometrical relief features (i.e. either negative-relief depressions and/or positive-relief projections), each of which has a periodicity in two dimensions dictated by a set of lattice basis vectors that can be combined to fill a plane with an ordered array. For instance, one set of basis vectors that can be used to create a square array on a flat plate is simply (Lx, Ly), where L is the center-to-center separation between the depressions on the lattice, x is the unit vector in a direction along the plane of the plate, y is a unit vector in a direction orthogonal to x along the plane of the plate, and z is a unit vector perpendicular to the plane of the plate pointing outwards from the surface of the plate. In some embodiments, it is desirable to choose L such that the center-to-center distance of the lattice is at least larger than the maximal dimension of the perimeter of the depression or projection that is centered on the lattice positions. For the purposes of making discrete particles according to some embodiments of the current invention, it is typically undesirable for local surface relief depressions to interconnect to form a continuous network when a first patterned surface and a second patterned surface are pressed together. In other embodiments of the current invention, forming an extended and interconnected network could be desirable (e.g. for electronics applications involving circuit connectivity over long distances). In some embodiments of the current invention, for the purposes of making discrete particles, it can be desirable to form a plurality of discrete and separate void-like regions having the desired particle shapes that are filled by particle material before the particle material is solidified. In some embodiments of the current invention, the set of basis vectors for the array may be complex, and there can even be two or more interpenetrating lattices. For instance, in some embodiments of the current invention a first patterned surface has been patterned with a hexagonal lattice of a local geometrical negative relief feature of wells using standard optical lithography and etching methods. In some embodiments, the array of surface relief features is only a repeating pattern of the same surface relief features over an entire patterned surface of a patterned plate. In other embodiments, a plurality of different surface relief features centered on one or more lattices can likewise be created lithographically on a first flat polished surface of a first patterned plate and on a second flat polished surface of a second patterned plate.

In some embodiments of the current invention, a first patterned surface of a first flat plate is pressed into mechanical contact with a second patterned surface of a second flat plate in the presence of a particle material that has been flowed and/or deposited into the region between the first and second patterned surfaces of the first and second plates. According to an embodiment of the current invention, as the two plates are mechanically pressed together at a controlled, desired, and specific relative position and relative orientation and at a controlled rate, particle material fills void-like regions formed by the local geometrical relief features on the first and second patterned surfaces (e.g. in the vicinity of the boundary between the first and second patterned surfaces), and any excess particle material that does not fill void-like regions is expelled out from between the flat portions of the first and second patterned surfaces that come in close proximity and contact. In some embodiments of the current invention, the particle material is at least somewhat incompressible, so it can be made to flow through the process of pressing together and contacting the first patterned surface with the second patterned surface. In an embodiment of the current invention, expelling the excess particle material occurs simply as a direct result of pressing the two plates together under pressure; any excess particle material flows out of the region between the first and second patterned surfaces. In some embodiments of the current invention, this excess particle material can be recovered and reused if desired. In some embodiments of the current invention, if expelling the excess particle material becomes difficult (e.g. for more highly viscous particle materials), then holes are fabricated into at least one of the first and the second patterned surfaces in order to permit the excess particle material to more easily be expelled from between the first and second patterned surfaces through the holes as the first and second patterned surfaces are pressed together. In some embodiments of the current invention, the flat portions of the first and second patterned surfaces that come into contact are very smooth and flat and have very low surface roughness so that very little to no particle material remains in between the first and second plates in the flat surface-contact regions. In other embodiments of the current invention, coating only flat surface contact portions of the first and second patterned surfaces with an anti-wetting material (e.g. with a thin layer or molecular layer of a material that the particle material does not readily wet) can be desirable. Since it can be desirable to expel all of the excess particle material from the flat surface-contact regions where the first and second patterned surfaces come into close proximity after pressing them into contact, creating an anti-wetting property of the flat surface contact regions can be advantageous in some cases, according to some embodiments of the current invention. In other embodiments of the current invention, a release material can be used to coat that surface relief features and an anti-wetting material can be used to coat the flat surface-contact features. In some embodiments of the current invention, if a thin layer of particle material does remain in the flat surface-contact regions between the two plates, which may not be desirable in particular cases, additional steps can be used to remove this excess particle material outside of the desired void-like regions at a later stage in the process, either before or after solidification.

According to some embodiments of the current invention, solidification of at least a portion of the particle material can occur through a chemical reaction and/or a physical process. In other embodiments, the solidification of a particle material can result from at least one of the following: a polymerization reaction, a photo-induced polymerization reaction, a thermal polymerization reaction, a crosslinking reaction, a photo-induced crosslinking reaction (e.g. for photoresist materials), a thermal crosslinking reaction, a solidification of a biomaterial (e.g. solution of proteins, polypeptides, DNA, RNA, or other materials), a sol-gel reaction (e.g. for silica or titania materials), a microscale particle aggregation process, a nanoscale particle aggregation process, a droplet coalescence reaction, a solvent evaporation, a calcining reaction, a hydration reaction, a sintering process, a phase transition process (e.g. a transition that leads to an elastic or viscoelastic phase, such as a crystalline solid, glassy solid, or liquid crystalline phase created by controlling parameters such as temperature and/or pressure), a vulcanization reaction, a reaction to create metal-organic frameworks (MOFs), a reaction to create covalent-organic frameworks (COFs), a reaction to create a ferroelectric material, a reaction to create a ferromagnetic material, a reaction to create a paramagnetic material, a reaction to create a diamagnetic material, a reaction to create a piezoelectric material, a reaction to create a metallic material, and a reaction to create a solid catalytic material.

According to some embodiments of the current invention, it is desirable to modify the composition of the particles by combining additives with the particle material, and such additives can include at least one of the following: non-reactive materials, reactive materials, fluorescent dye molecules, quantum dots, iron oxide nanoparticles, colloidal silver particles, gold clusters, and pigment dye particles.

According to some embodiments of the current invention, a particle material is solidified by creating a temperature change of particle material that results from at least one of a heating and a cooling. In an embodiment of the current invention, an oligomeric particle material can be solidified through polymerization induced by heating the particle material to a higher temperature. Alternatively, in another embodiment of the current invention, waxy particle materials and glassy particle materials can be solidified by cooling such particle materials to a temperature below a solidification temperature or a glass transition temperature.

According to some embodiments of the current invention, if positive surface relief features are present on at least one of the first or the second patterned surfaces, then some additional constraints on the relative positions and orientations of the first and second plates, as well as the local geometrical features can exist. For instance, according to some embodiments of the current invention, the patterned surfaces have been designed so that a plurality of positive local relief features on a first patterned surface fit inside a plurality of negative surface relief features on the second patterned surface. According to some embodiments of the current invention, flat reference surfaces (i.e. surface-contact regions) of the plates meet so that positive relief features do not contact a surface-contact region. In some embodiments of the current invention, the first patterned surface must be positioned and aligned relative to the second patterned surface in a manner that ensures some degree of mating of the local geometrical features on the first and second patterned surfaces, so that the positive relief regions on one patterned surface fit inside the negative relief regions on the other patterned surface. According to some embodiments of the current invention, a volume of a positive relief feature on one patterned surface must be smaller than a volume of a proximate negative relief feature on the other patterned surface so that at least a void-like region is formed in which some of the particle material can be solidified to form a particle.

According to some embodiments of the current invention, it is desirable to coat the plates with a release material that facilitates the release of particles from the patterned surfaces after the patterned surfaces are pressed together and after the particle material has been solidified. According to an embodiment of the current invention, a release material can be either permanent or temporary. According to another embodiment, a release material can beneficially alter the surface wetting and surface energy properties of the particle material as it interacts with at least one of a first patterned surface and a second patterned surface. In an embodiment of the current invention, a release material is applied only to portions of the patterned surfaces of at least one of a first patterned surface and a second patterned surface.

In some embodiments of the current invention, in order to facilitate the alignment and rotation of the plates, alignment marks, which can be used to provide the positions and orientations of the plates to a mechanical particle production system, are made on the plates through processes such as lithographic etching and/or deposition. In some embodiments, these alignment marks can be accessible by a variety of possible means (e.g. optically, electromagnetically, or mechanically) in order to facilitate the positioning and orienting of one or both plates. In embodiments involving rotation of at least one patterned surface, it can be desirable to create a first patterned surface on a first plate and a second patterned surface on a second plate, where each plate has a circular outer perimeter, so that there is efficient overlap between the plates regardless of the orientation of the plates. In other embodiments in which a photo-sensitive material is used for the particle material, at least one of the plates can be made from an optically transmitting material, such as quartz. In some embodiments, metal, alumina, titania, glass, silicon, quartz, and other types of solid materials can be used for the plate material. In some embodiments, it is advantageous to deposit a layer of a patterning material, such as silicon dioxide or silicon nitride, on the surface of a plate in order to facilitate the patterning of the plate's surface.

According to an embodiment of the current invention, a mechanical particle production system can be used to rapidly and repeatedly implement a process of ATP, thereby facilitating automated, high-throughput production of custom-shaped particles. A highly precise positioning stage (mechanical, motor-driven, piezoelectric, feedback-controlled or a combination thereof) can be used to manipulate the first and the second patterned plates in the manner described in the process. In some embodiments, this mechanical particle production system typically utilizes one or more 3-dimensional alignment stages that provide x, y, z control of the position of a plate, rotation of a plate in a plane parallel with the plate's flat surface, as well as tip-tilt of a plate which precisely control the plate's other two orientation angles. For example, using one or more positioning stages, one or both patterned plates can be properly and precisely aligned (i.e. positioned and oriented) as they are pressed together by the imprinting system. A first patterned plate can be held by a mechanical support that ensures that the first patterned surface on the plate is exposed and that the plate does not deform significantly (e.g. the first patterned plate can be held by a first vacuum chuck or clamping mechanism). Optionally, a first mechanical support can be optically transparent to facilitate optical exposure. In addition, optionally, this first mechanical support can include a heater (such as a thermoelectric heater/cooler, resistive heater, heat exchanger, or other thermal control device) to uniformly change the temperature of the first patterned plate. In some cases, this first mechanical support can be rigidly fixed; in other cases, this mechanical support can be moveable and attached to a positioning stage. The second patterned plate can also be held by a mechanical support (e.g. a second vacuum chuck). The second mechanical support can also hold the second plate in a manner that exposes the patterned surface of the second plate and ensures that a second patterned surface on the second plate does not deform significantly (e.g. the second plate can be held using a second vacuum chuck or clamping mechanism). This second mechanical support can be attached to a positioning stage. In addition, the second mechanical support can be used to position the second plate such that it is roughly centered on the first plate and such that the surface normal vector pointing outward from the flat surface portions of the second plate is opposite in direction to the surface normal vector pointing outward from the flat surface portions of the first plate. Optionally, the second mechanical support can also be optically transparent and/or provide a means of heating or cooling the second plate. The edges of each of the first and second patterned plates can also be used as a reference relative to the array of local surface relief features in order to provide precise alignment of the relative position and relative orientation of the first and second patterned plates. In some cases, it can be desirable to have some form of detection (e.g. optical) to verify that the center locations of the lattices on each of the two plates properly overlap over a large area. In an embodiment of the current invention, a mechanical particle production system incorporates a mechanical mechanism that ensures that the first and second patterned plates can be pressed together mechanically in a manner that provides a suitable pressure over the entire region of contact between the first and second patterned plates.

In some embodiments of the current invention, in order to facilitate accurate particle production, a mechanical particle production system may incorporate one or more cameras, interferometers, and/or other optical detectors to sense positions and orientations of the first and second plates. In other embodiments, other types of position sensitive detectors or orientation sensitive detectors, such as capacitive detectors, position sensitive photodiodes, or optical encoders, could also be used. Some of these sensors function more accurately when monochromatic laser light is employed; therefore, according to some embodiments, one or more lasers can be components of the mechanical particle production system. These sensors can be connected to a control computer that provides signals to the mechanical and piezoelectric actuators in the first and second mechanical supports in a manner that creates a feedback loop. This feedback can be used to ensure that the two plates are aligned to the desired relative position and rotation very precisely. In some embodiments of the current invention, it is desirable to overlap the centers of the array of patterned features on the surface of the first plate with the centers of the array of patterned features on the surface of the second plate to a precision within 100 nm or less over the entire surface of the two plates using state-of-the-art positioning systems, some of which may incorporate piezoelectric actuators, when the first and second patterned surfaces are closely approached and pressed into contact.

In some embodiments of the current invention, one or more components in a two patterned surface imprinting system for producing particles are temperature controlled so that the plates and any gases or other fluids around them are maintained at a very uniform temperature to reduce uneven thermal expansion that could cause the local surface relief features on the patterned surfaces to be out of alignment. Maintaining temperature control can facilitate a desired alignment of local surface relief features on the first and second patterned surfaces over an area that is many times larger than the largest dimension characterizing a local surface relief feature (e.g. a well).

In some embodiments of the current invention, a mechanical particle production system can incorporate a means of supplying a particle material to the region between the first and second plates. According to an embodiment of the current invention, one method for supplying a liquid particle material is to coat at least a portion of the patterned surfaces of the first and second plates with the particle material through spray deposition (e.g. prior to bringing the two surfaces into proximity). According to another embodiment, an alternative method is injecting a fluid particle material through a hole in one or both plates that extends through to the patterned surfaces. Yet other embodiments involve physical and/or chemical vapor deposition of a particle material, spreading of a liquid particle material between the two plates by capillary action, or even coating the patterned surfaces of the first and second plates with a solid particle material that can be melted in a thermal step prior to pressing the patterned surfaces of the first and second patterned plates together.

Optionally, according to an embodiment of the current invention, one or both patterned plates can be heated or cooled while pressed together by a thermal temperature-controlled stage or other device that can be used to change the temperature in order to affect the mechanical properties of the particle material (e.g. to solidify the particle material).

Optionally, according to an embodiment of the current invention, a mechanical particle production system can incorporate an optical illumination assembly that permits and optical exposure of the particle material sufficient to cause changes in mechanical properties (i.e. solidification and/or crosslinking) of the particle material. According to an embodiment of the current invention suited for optical exposure, this exposure can be a uniform flood exposure using light at a wavelength and intensity that can cause chemical reactions in the particle material. In some cases, the optical illumination assembly can contain a partially transmitting mask for creating spatially patterned light. In another embodiment of the current invention, by selectively illuminating only regions only where void-like regions are present but not the entire area of the plate, only the particle material in the void-like regions can be solidified. Spatially selective solidification of particle material can facilitate removal of any imperfectly expelled particle material from between the flat portions of the two patterned surfaces outside the void-like regions where particles are formed. Any unsolidified particle material can often be washed away using a solvent more easily than the solidified particle material can be removed.

According to some embodiments of the current invention, after particle material is solidified concurrent with and/or subsequent to the pressing of the first and second patterned surfaces together by applying mechanical forces to the first and second plates, the first and second patterned surfaces can be separated by mechanically exerting forces on the first and second plates to pull the two plates apart. Depending upon the surface treatments used for release and anti-wetting, discrete solid particles of the solidified particle material can reside on the patterned surfaces of the first plate, the second plate, or a combination thereof. According to an embodiment of the current invention, to release discrete particles from the patterned surfaces of the separated plates, a force can be exerted on the particles. According to an embodiment of the current invention, gravitation forces or electromagnetic forces can be used to cause the particles to release from the patterned surfaces, forming an aerosol (i.e. a dust of particles dispersed in a gas). Alternatively, a flowing fluid material, such as a pressurized gas or liquid stream, can be used to separate the particles from the patterned surfaces. According to some embodiments of the current invention, particles released from the patterned surfaces of one or both plates into the release fluid can be stabilized against subsequent agglomeration in the release fluid by a substance (e.g. stabilization agent such as a surfactant, co-polymer, and/or nanoparticulate) that has been added in the fluid material to inhibit agglomeration. In yet another embodiment, ultrasonic excitation through a fluid material can be used to release particles from the first and second patterned surfaces of the first and second patterned plates. Alternatively, according to another embodiment of the current invention, a release material forming a sacrificial layer between a patterned surface and a particle material can be removed, for example by dissolving the release material comprising the sacrificial layer into a fluid material in which the release material is soluble. In some embodiments of the current invention, at least a portion of a plurality of particles released from the patterned surfaces are separated and retained as a useful product, by collecting the fluid material in which the released particles reside after the release process. According to an embodiment of the current invention, the first and second patterned surfaces remain clean or can be readily cleaned (and dried if necessary) so the mechanical process for producing particles can be repeated to produce additional particles.

In some embodiments of the current invention, the solidification of particle material creates solid particles that are highly elastic and hard. In other embodiments, the solidification of the particle material may create a weakly elastic soft solid. If the solidification of the particle material creates a soft solid, this soft solid can be flexible and can have viscoelastic mechanical properties. According to some embodiments of the current invention, the particle material (i.e., particle shapes) after solidification retains at least a partial memory of the surface relief features and the relative alignment of a first patterned surface with respect to a second patterned surface. According to some embodiments of the current invention, the particles, once formed, do not change shape significantly over time at atmospheric pressure and for a range of temperatures above about 250 K and below about 400 K (i.e. near the range of common ambient temperatures).

According to some embodiments of the current invention, a first surface-contact region on a first patterned surface is substantially complementary to the a second surface-contact region on a second patterned surface; for instance a first surface-contact region can be curved in a concave manner and a second surface-contact region can be curved in a convex manner According to some embodiments of the current invention, useful lithographic patterning methods for designing a patterned surface of a plate include: electron-beam lithography, x-ray lithography, ion-bombardment lithography, optical lithography, deep ultraviolet lithography, extreme ultraviolet lithography, ultraviolet lithography, visible optical lithography, direct write laser lithography, ultraviolet stepper lithography, holographic laser patterning lithography, holographic optical lithography, dip-pen nanolithography, nanoprobe-based lithography (e.g. STM, AFM, etc.), and nanoimprint lithography. This list is not intended to be exhaustive, and many other lithographic methods exist for patterning surfaces.

An Embodiment for Fabricating a Plurality of Custom-Shaped Particles

According to an embodiment of the current invention, a mechanical process can be employed to produce a plurality of particles using the following steps:

1. Design and fabricate a first patterned surface on a first plate and a second patterned surface on a second plate using microscale or nanoscale lithographic methods. For instance, a plurality of local geometrical surface relief features, including their relative distances between said surface relief features, can be precisely defined over a large fraction of a first patterned surface of a first plate using lithographic methods. Similarly, a plurality of local geometrical surface relief features, including their relative distances between said surface relief features, can be precisely defined over a large fraction of a second patterned surface of a second plate using lithographic methods. In some cases, the first patterned surface contains an array of local surface relief features over an extensive surface area, and the second patterned surface contains an array of surface relief features, which may be the same or different than those on the first patterned surface, yet which typically has the same lattice spacing as the lattice spacing on the first patterned surface. Optionally, alignment marks are made on a patterned surface, on an unpatterned surface, on edges, or on a combination thereof on the first and the second plates.

2. Design and fabricate a second circular plate having a second patterned surface using known microscale or nanoscale lithographic methods, similar to but not necessarily identical to the plate described in step 1 in this example embodiment. Typically, the second patterned plate has an array of surface relief features with the same lattice vectors as the first patterned plate; the surface relief features on the second patterned plate may be similar to or different than the surface relief features on the first patterned plate.

3. Mount the first and the second plates into a mechanical system for producing particles using a first and a second patterned surface.

4. Load the mechanical particle production system with a supply of particle material and provide a supply of a fluid material (i.e. a fluid material). Optionally, load the mechanical particle production system with a supply of a release material.

After designing, fabricating, and creating and creating a first patterned surface on a first plate and a second patterned surface on a second plate, the following steps can be used to fabricate a plurality of custom-shaped particles in a high-throughput. These steps can be automatically repeated by a mechanical particle production system:

5. Optionally, a release material is deposited onto at least a portion of the surfaces of the first patterned surface of the first plate and/or the second patterned surface of the second plate. One or more release materials can be deposited to facilitate the subsequent deposition of the particle material into any void-like regions before its solidification, the expelling of particle material from flat surface-contact regions outside the void-like regions, and the release of the particles made from particle material from the patterned surfaces of the plates after solidification of the particle material. If the release material is permanent (i.e. not temporary or sacrificial), then performing this deposition step only once initially may be adequate even if the first and the second plates are re-used in subsequent iterations of producing particles.

6. Deposit particle material on the first and/or the second patterned plates in sufficient quantity to fill all of the void-like regions when the two plates are aligned and pressed together. Depositing an excess of particle material compared to the total volume of void-like regions is typical. The mechanical particle production system regulates the volume of particle material dispensed, and typically this volume is near or larger than the total volume of the void-like regions. Optionally, this step could be performed in a different order, after the alignment described in step 7.

7. Align the first patterned surface of the first plate relative to the second patterned surface of the second plate in a desired pre-specified manner. This can be accomplished using a mechanical particle production system. This system adjusts the position of the center of the first plate relative to the center of the second plate, adjusts the angle of rotation of the first plate relative to the second plate, and adjusts the tip-tilt of the first plate and of the second plate so that the first patterned surface is substantially parallel with the second patterned surface. Upon the completion of this step, the first patterned surface faces the second patterned surface, is aligned in a desired manner with respect to the second patterned surface, and is proximate to the second patterned surface but not in contact with it. Typically, an imagined projection of an array of surface relief features on the first patterned surface of the first plate onto the second patterned surface of the second plate would spatially coincide at least partially with the array of the surface relief features on the second patterned surface of the second plate. This precision alignment step can be facilitated through detection of alignment marks and/or the surface relief features on the first plate and/or on the second plate. Typically, the patterned surfaces of the first and the second plates are aligned by actuators relying upon feedback from detectors; both actuators and sensors are controlled by a computer that is a part of the mechanical particle production system. In some cases, it may be advantageous to offset and/or rotate the array of surface relief features on the first patterned plate with respect to the array of surface relief features in order to control and vary features of the resulting particle shapes in a manner that provides a desired particle shape or range of desired particle shapes.

8. Press the first patterned surface of the first plate together into the second patterned surface of the second plate with a particle material present between them. In some cases, flat surface-contact regions of the first plate make close mechanical contact with flat surface-contact regions of the second plate. (Flat surface contact regions typically exist between local geometrical surface relief features on a patterned surface.) After the first and second patterned surfaces are brought into close proximate contact, the particle material occupies the void-like regions formed between the two plates bounded at least in part by the surface relief features and any excess particle material is expelled out from the edges of the plates, leaving very little particle material in the regions where flat surface-contact regions of the first and the second patterned surfaces effectively make contact. During the pressing step, the relative alignment of the two plates is preserved very accurately. For example, this can be accomplished using feedback control of the positions and orientations of alignment marks on the first and the second plates and mechanical actuators. Optionally, any excess particle material is collected and re-used by the mechanical particle production system.

9. Solidify the particle material that occupies the void-like regions between the first and the second plate using a chemical reaction that results in a solid material and/or a physical process that results in a solid material. Examples of some reactions and processes that can be used in this step have been described previously in this invention report. Ideally, a plurality of discrete and disconnected solid particles that have the desired shape are formed in the void-like regions between the two plates. In most cases, the solidification process will not create a volume expansion of the particle material.

10. Separate the first patterned surface of the first plate from the second patterned surface of the second plate. This can be accomplished using the plate positioning system that is present in the mechanical particle production system. If the affinity of the solidified particle material for the plate material is very strong (i.e. if the solidified particle material acts as a glue), then it may be necessary to liquefy or vaporize a release material that has been previously deposited on the patterned surfaces in order to mechanically separate the first plate from the second plate.

11. Remove discrete particles from the first patterned surface and/or the second patterned surface. Typically, this is accomplished using a fluid material that can be flowed and agitated in a manner to contact the patterned surfaces and dislodge the particles from these surfaces. The fluid material can also dissolve the release material in order to facilitate the release. The fluid material can contain stabilizers that inhibit agglomeration of the particles after they are released from the patterned surfaces. Typically, the fluid material containing the released particles is collected and separated from the plates.

12. The first and second plates are cleaned, if necessary. This can involve a heating process, an acidic or basic chemical process, an oxidation, a mechanical scrubbing, a washing, and/or other cleaning processes. Typically, the first and second plates after cleaning can be re-used to produce more particles according to this process. In most cases, the cleaning process does not scratch or otherwise roughen the flat surface-contact regions and the cleaning process does not alter the surface relief features.

13. Optionally, the first and second plates are dried of any residual fluids from step 12. If these fluids are potentially hazardous, corrosive, or harmful, a ventilation outlet for gases and a drain outlet for liquids into a proper waste container that has been connected to the mechanical particle production system.

14. The mechanical particle production system determines the levels of materials in storage reservoirs using sensors (e.g. using level sensors, floater sensors, and/or optical sensors) and automatically replenishes these materials from larger storage reservoirs connected to the system by computer-controlled valves and pipes or tubes.

15. The portion of the process for making particles using two patterned surfaces can be repeated by starting again at step 5. Thus, repetitive automated production of particles by the mechanical particle production system can be made through a computer-controlled, software-driven device that facilitates automatic particle production. This automation obviates the need for repetitious human intervention.

According to some embodiments of the current invention, the release material can be a liquid that wets the plate material and is immiscible with the particle material.

According to an embodiment of the current invention, to ensure good mechanical contact over the entire region of patterned surfaces during the solidification of the particle material, it is usually advantageous to keep the flat surface-contact regions on the patterned surfaces clean and unscratched.

According to other embodiments of the current invention, it is not strictly necessary for the surface relief features on the first and/or the second plates to be positioned in ordered arrays. According to some embodiments of the current invention, the surface relief features on a first plate can be aligned with respect to the surface relief features on a second plate in order to create void-like regions each of which has a surface boundary formed at least in part by a portion of surface relief features on the first patterned surface on the first plate and also a portion of the surface relief features on the second patterned surface on the second plate. According to another embodiment, plates that have patterned surfaces containing disordered surface relief features or regular, but non-array, patterns of surface relief features.

Example Embodiment #1

Production of Flange-like Particles Having a Controllable Flange Length using Alignment of Two Patterned Surfaces A design for an array of square platelets is created using computer-aided-design software. This design is used to produce a lithographic mask that can be used in a lithographic device, such as a stepper, to pattern the surfaces of smooth polished circular wafers (i.e. flat plates). Optionally, the wafers have a "flat" (i.e. portion removed along an edge) to facilitate alignment. Lithographic patterning and etching is performed on a flat, smooth, polished silicon wafer having a diameter that typically ranges between about 0.2 cm to about 20.0 cm and a minimum thickness that is typically larger than about 50 microns, and more preferably thicker than about 200 microns. Adequate thickness of the plate typically inhibits undesirable effects such as breakage and bending, yet plates that are too thick may be more costly and difficult to load in any mechanical particle production system.

A first patterned surface contains an array of identical local geometric surface relief features over almost its entire surface. In this example, the first patterned surface consists of an array of square depressions that have been etched into one surface of a first circular plate, as shown in FIG. 1(a). The second patterned surface consists of an identical array of identical square depressions on one surface of a second circular plate, as is also shown in FIG. 1(a). For example, a local surface relief feature can be a square well having a depth of one micron and an edge length of the square that is 3 microns. For example, the lattice spacing between the centers of the squares might be 7 microns along both orthogonal lattice vectors to form a square lattice of square wells. Typically, for the purposes of making discrete particles, the lattice spacing is at least twice the maximum lateral dimension of the wells in order to facilitate the creation of discrete void-like regions even if the first patterned surface is offset relative to the second patterned surface. If the lattice spacing is chosen to be too small compared to the maximum dimension of the discrete surface relief features (i.e. depressions), then it is possible to create continuous structures that could span nearly the dimensions of the plate. Although this example shows surface relief features consisting of a square well having a flat bottom, in other examples, the surfaces of local relief depressions could have boundary contours other than flat planes.

Figure 1B:
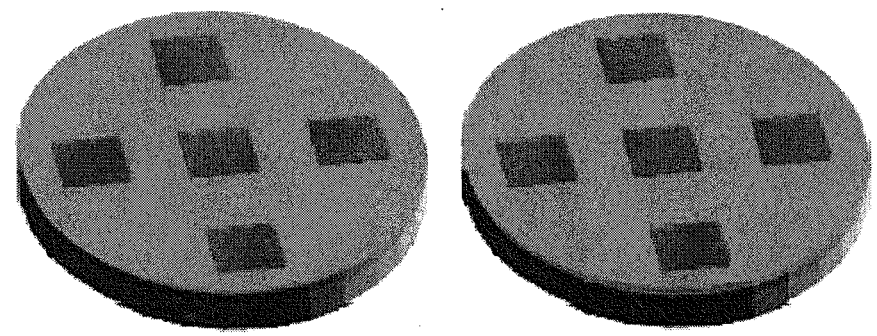
FIG. 1(b) is a schematic illustration of a first patterned surface upon which a particle material (shown in red with a degree of transparency to facilitate viewing the surface relief features) is deposited and a second patterned surface upon which a particle material is deposited, as a step in a process for making custom-shaped particles, according to an embodiment of the current invention.
Figure 1C:
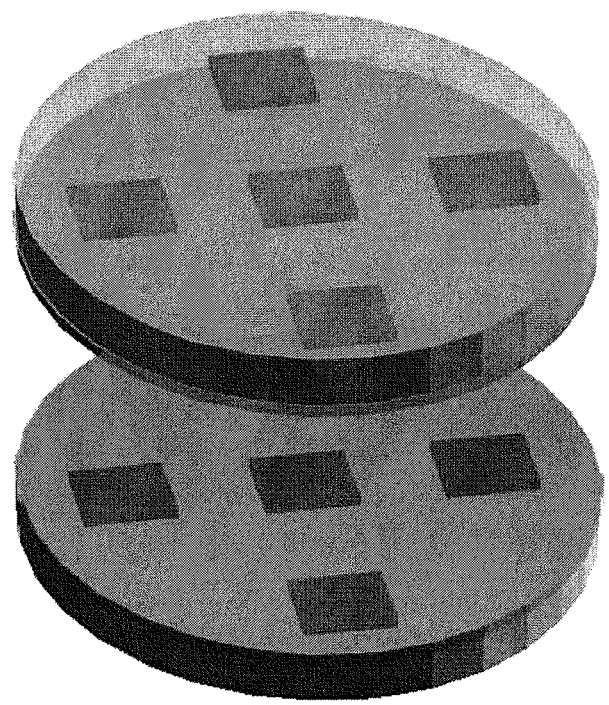
FIG. 1(c) is a schematic illustration of a first patterned surface upon which a particle material (red region) has been deposited and a second patterned surface upon which a particle material has been deposited, where the second patterned surface has been arranged to face the first patterned surface, as a step in a process for making custom-shaped particles, according to an embodiment of the current invention.
Figure 1D:
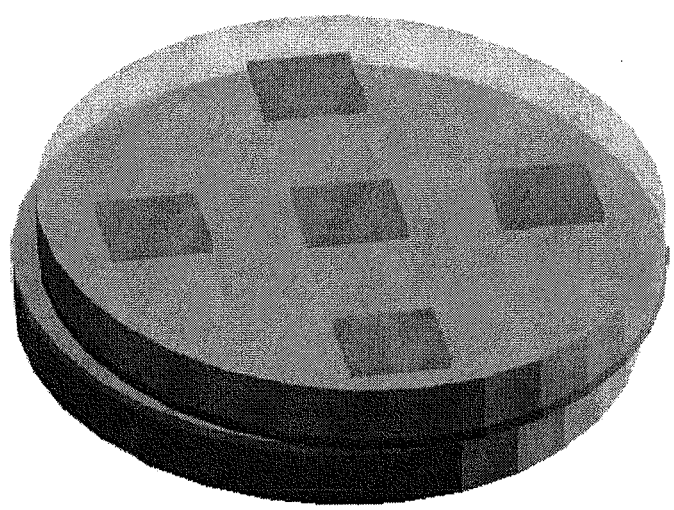
FIG. 1(d) is a schematic illustration of aligning the first patterned surface upon which particle material has been deposited relative to the second patterned surface upon which particle material has been deposited, as a step in a process for making custom-shaped particles, according to an embodiment of the current invention. As shown, the lattice of square wells in the first patterned surface is offset a desired pre-specified amount along one lattice direction relative to the lattice of square wells in the second patterned surface. The first patterned surface is facing the second patterned surface.
Figure 1E:
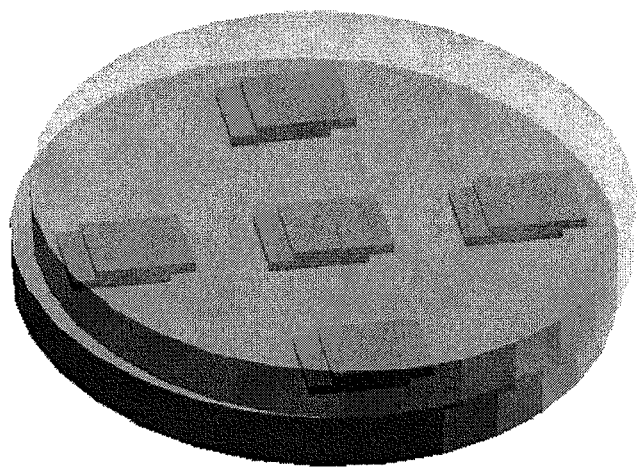
FIG. 1(e) is a schematic illustration of contacting the first patterned surface upon which particle material has been deposited to the second patterned surface upon which particle material has been deposited, as a step in a process for making custom-shaped particles, according to an embodiment of the current invention. As shown, the lattice of square wells in the first patterned surface is offset a desired pre-specified amount along one lattice direction relative to the lattice of square wells in the second patterned surface. The process of contacting defines an array of a plurality of identical void-like regions in the form of flanges that are filled with particle material (red discrete regions). Typically, it is desirable for any excess particle material to be expelled outward from the flat contacting regions between the first and second patterned surfaces during the process of contacting.
Figure 1F:
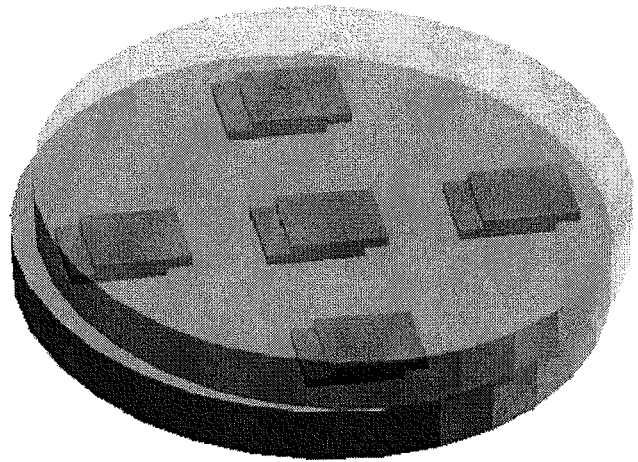
FIG. 1(f) is a schematic illustration of solidifying the particle material that fill the plurality of void-like regions between the first patterned surface and the second patterned surface, as a step in a process for making custom-shaped particles, according to an embodiment of the current invention. Typically, the solidification represents a substantial increase in an elastic modulus of the particle material through at least one of a physical and a chemical process. This elastic modulus is typically large enough to overcome the effects of surface tension, thermal energy, or other forces that might otherwise cause the particles to lose the shape that is imparted by the geometrical features in the first and second patterned surfaces. The resulting plurality of discrete regions of solidified particle material (blue regions) effectively become a plurality of custom-shaped particles that have a pre-specified shape determined in part by a combination of the first patterned surface, the second patterned surface, and the relative alignment of the first patterned surface with respect to the second patterned surface.
Figure 1G:
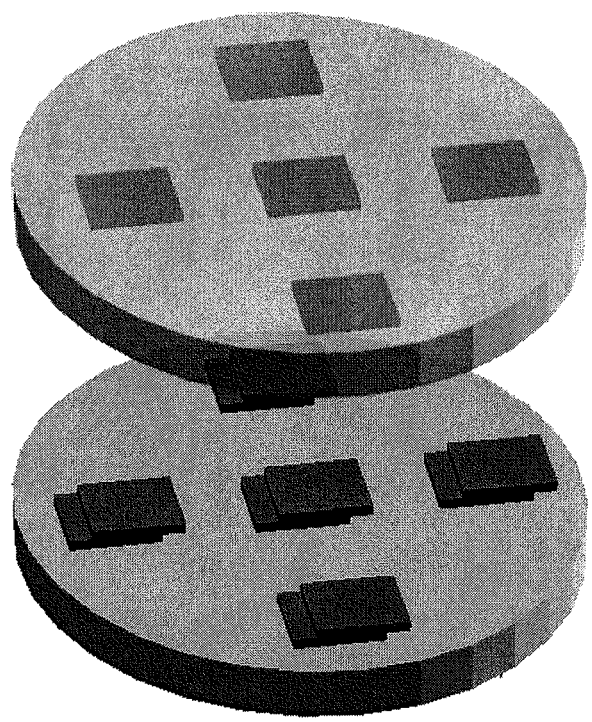
FIG. 1(g) is a schematic illustration of separating the first patterned surface from the second patterned surface after solidifying particle material (blue regions) in the plurality of void-like regions, as a step in a process for making custom-shaped particles, according to an embodiment of the current invention. Although custom-shaped particles are shown in proximity to only one of two patterned surfaces, in general, custom-shaped particles may be in proximity to both patterned surfaces.
Figure 1H:
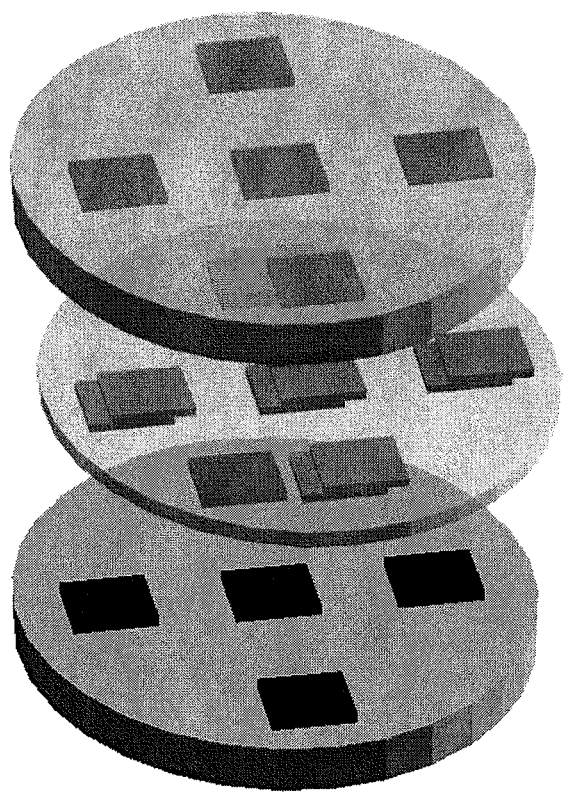
FIG. 1(h) is a schematic illustration showing release of custom-shaped particles of solidified particle material (blue regions) into a fluid material (green region) concurrent with or after separating the first patterned surface from the second patterned surface, as a step in a process for making custom-shaped particles, according to an embodiment of the current invention. Typically, the fluid material contacts the first and second patterned surfaces, and optionally agitation is used to facilitate the release of custom-shaped particles from at least one of the patterned surfaces into the fluid material.
Figure 1I:
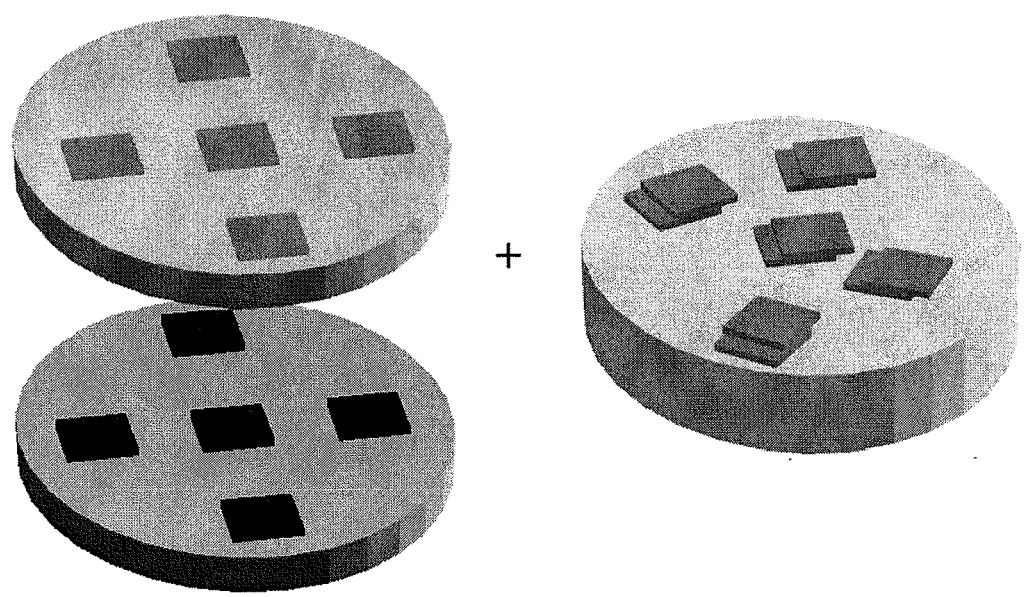
FIG. 1(i) is a schematic illustration showing separation of custom-shaped particles (blue regions) in the fluid material (green region) from the first patterned surface and second patterned surface, as a step in a process for making custom-shaped particles, according to an embodiment of the current invention. Typically, the first and second patterned surfaces are substantially unaltered by the process of making custom-shaped particles, so both patterned surfaces are suitable for re-use in making additional custom-shaped particles.

An array of local geometrical surface relief features on a patterned surface can have many more square depressions than those shown schematically in FIG. 1(a). Each depression typically has a maximum dimension that is sub-millimeter. The patterned surface of each of the two plates is coated with an unsolidified particle material (red color), which is typically viscous or viscoelastic, as shown in FIG. 1(b). Typically, this particle material fills the depressions and has at least one of a viscous property, a viscoelastic property, and a viscoplastic property so that it can be displaced and/or deformed readily if the patterned surfaces of the two plates are pressed together. One plate is inverted and moved opposite the other plate so that the patterned surfaces that have been coated with particle material on the two plates face each other, as shown in FIG. 1(c). This can be accomplished using a mechanical system for producing particles according to some embodiments of the current invention. The plates are precisely aligned into a desired relative position and orientation and are held in this relative position and orientation as the patterned surfaces on the plates are pressed together, as shown in FIG. 1(d) and FIG. 1(e). In the example shown, the plates have been slightly displaced on purpose along one lattice direction so that the arrays are offset slightly to make flange-like particles. As the patterned surfaces on the two plates are pressed together, any excess unsolidified particle material is expelled out from between the two plates (see FIG. 1(e)). Once the patterned surfaces are fully pressed together, the particle material fills and occupies the plurality of discrete void-like regions bounded by the patterned surfaces of the first and the second patterned plates. It is typically desirable for particle material to be excluded from regions between the patterned surfaces that are outside the discrete void-like regions. The particle material present in the void-like regions is solidified using a physical and/or chemical process, as shown in FIG. 1(f). The solidified particle material (blue color) forms a plurality of identical solid flange-like particles. The patterned surface of the first plate is separated from the patterned surface of the second plate, as shown in FIG. 1(g). Solid particles could release automatically from the void-like regions into a fluid material after this step. Alternatively, the particles could remain in the void-like regions on the first and/or the second plates, requiring fluid-assisted release using a fluid material in a subsequent step. Alternatively, the temperature of the plates could be changed to cause a difference in thermal expansion or compression that causes the particles to release from the patterned surfaces. Typically, the particles are released from the patterned surface by contacting the particles with a fluid material (green), as shown in FIG. 1(h). A form of agitation of the fluid material in contact with the particles may be used to increase the rate of separation of the particles from the patterned surfaces. The fluid material typically contains a stabilizer that inhibits the aggregation and/or agglomeration of the particles after release. For ease of display, the fluid material is shown as a disk; typically, the fluid material will generally extend beyond the limited region shown. Subsequently, the fluid material containing the released flange-like solid particles is separated from the plates, as shown in FIG. 1(i). Optionally, the patterned surfaces on the plates can be cleaned and re-used for making additional custom-shaped particles.

Example Embodiment #2

Shape-Designed Particles Created by Controlling the Relative Positional Alignment of Two Plates Along One Lattice Direction The following example embodiment of the current invention simply illustrates a subset of the possible resulting uniform shapes that can be obtained in high-throughput production by changing the relative position offset of two plates shown in FIG. 1(a). By displacing the array of square wells on a first patterned surface on a first plate relative to the array of square wells on a second patterned surface of a second plate along only one lattice basis direction, void-like regions can be created that resemble simple flanges in which particle material can be solidified and from which flange-like particles can be released. The distances and aspect ratio of the flanges can be controlled simply through the relative positioning of the patterned surfaces on the two plates as the patterned surfaces are pressed together. Thus, the surface relief features etched on the first and second plates are only partially important in determining the final shape of the particles; at least some aspect of the final shape of the particle is determined by the relative position and orientation of the first and the second plates. By contrast, it would be very difficult to create and release such flange-like particles using an imprinting method involving only a single patterned plate because such particles would tend to get stuck due to geometric constraints in a similar void-like region resembling a flange that has been created on a single plate, thereby precluding facile and non-destructive release of the particles from the single patterned plate.

Figure 2A:
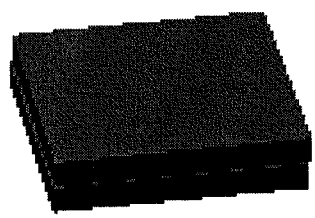
FIG. 2(a) is a schematic illustration of an example of a custom-shaped particle produced, according to an embodiment of the current invention. For the example shown, the first patterned surface has been aligned relative to the second patterned surface so that the centers of the square wells arranged in a square lattice on the first patterned surface are exactly opposite the centers of the square wells arranged in a square lattice on the second patterned surface. For the example shown, the first patterned surface and second patterned surface both resemble those surfaces shown schematically in FIG. 1(a).
Figure 2B:
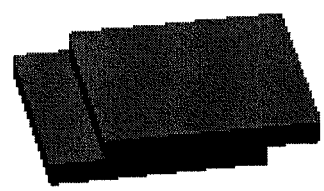
FIG. 2(b) is a schematic illustration of an example of a custom-shaped particle produced, according to an embodiment of the current invention. For the example shown, the first patterned surface has been aligned relative to the second patterned surface so that the centers of the square wells arranged in a square lattice on the first patterned surface are offset along one lattice direction relative to the centers of the square wells arranged in a square lattice on the second patterned surface. For the example shown, the first patterned surface and second patterned surface both resemble those surfaces shown schematically in FIG. 1(a).
Figure 2C:
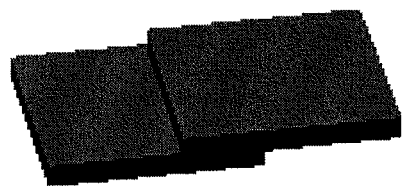
FIG. 2(c) is a schematic illustration of an example of a custom-shaped particle produced, according to an embodiment of the current invention. For the example shown, the first patterned surface has been aligned relative to the second patterned surface so that the centers of the square wells arranged in a square lattice on the first patterned surface are offset more substantially than in FIG. 2(b) along one lattice direction relative to the centers of the square wells arranged in a square lattice on the second patterned surface. For the example shown, the first patterned surface and second patterned surface both resemble those surfaces shown schematically in FIG. 1(a). This example emphasizes that the shape of the particle produced is highly dependent upon the relative alignment of the first patterned surface with respect to the second patterned surface.

Differently shaped flange-like particles can be made by pre-specified design using the patterned surfaces shown in FIG. 1(a) simply by controlling the relative separation of the arrays along the direction of one lattice vector before pressing the plates together and solidifying the particle material. The absence of a relative displacement of the arrays of square well depressions on the patterned surfaces yields a plurality of block-like particles, an example of which is shown in FIG. 2(a). A small relative displacement of the array on the first patterned surface with respect to the second patterned surface yields a plurality of flange-like particles each of which has a small aspect ratio of length to width and an example of which is shown in FIG. 2(b). A larger relative displacement of the array on one patterned surface relative to the second patterned surface yields a plurality of flange-like particles each of which has a larger aspect ratio and an example of which is shown in FIG. 2(c). The particular shapes shown are only a small subset of a continuous range of particle shapes that can be obtained by controlling the relative position and orientation of the first patterned surface with respect to the second patterned surface.

Example Embodiment #3
Shape-Designed Particles Created by Controlling the Relative Positional Alignment of Two Patterned Surfaces Along Two Different Lattice Directions According to the following example embodiment of the current invention, by displacing an array of square wells on a first patterned surface on a first plate relative to the array of square wells on a second patterned surface on a second plate along two different orthogonal lattice directions (e.g. given by a set of lattice basis vectors that can be used to describe the array), void-like regions resembling complex flanges can be created and in which particle material can be solidified and from which flange-shaped particles can be released. The distances and aspect ratio of the flanges can be controlled simply through the relative positioning of the plates when they are pressed together. Thus, the surface relief features etched on the first and second patterned surfaces are only partially important in determining the final shape of the particles; at least some aspect of the final shape of the particles is determined by the relative position and orientation of the first and the second patterned surfaces.

Figure 3A:
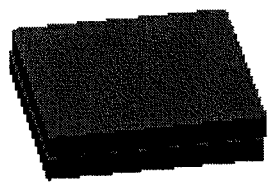
FIG. 3(a) is a schematic illustration of an example of a custom-shaped particle produced, according to an embodiment of the current invention. For the example shown, the first patterned surface has been aligned relative to the second patterned surface so that the centers of the square wells arranged in a square lattice on the first patterned surface are exactly opposite the centers of the square wells arranged in a square lattice on the second patterned surface. For the example shown, the first patterned surface and second patterned surface both resemble those surfaces shown schematically in FIG. 1(a).
Figure 3B:
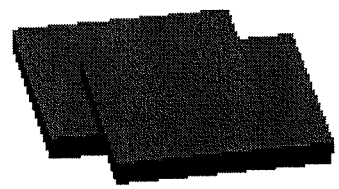
FIG. 3(b) is a schematic illustration of an example of a custom-shaped particle produced using APSPI, according to an embodiment of the current invention. For the example shown, the first patterned surface has been aligned relative to the second patterned surface so that the centers of the square wells arranged in a square lattice on the first patterned surface are offset the same amount along a first lattice direction and also along a second orthogonal lattice direction relative to the centers of the square wells arranged in a square lattice on the second patterned surface. For the example shown, the first patterned surface and second patterned surface both resemble those surfaces shown schematically in FIG. 1(a).
Figure 3C:
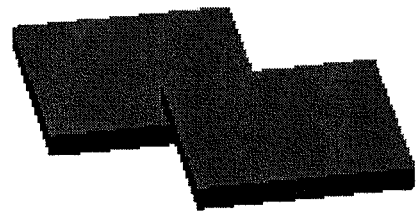
FIG. 3(c) is a schematic illustration of an example of a custom-shaped particle produced, according to an embodiment of the current invention. For the example shown, the first patterned surface has been aligned relative to the second patterned surface so that the centers of the square wells arranged in a square lattice on the first patterned surface are offset more substantially than in FIG. 3(b) along a first lattice direction and also along a second orthogonal lattice direction relative to the centers of the square wells arranged in a square lattice on the second patterned surface. For the example shown, the first patterned surface and second patterned surface both resemble those surfaces shown schematically in FIG. 1(a). This example re-emphasizes that the shape of the particle produced is highly dependent upon the relative alignment of the first patterned surface with respect to the second patterned surface.

Complex flange-shaped particles can be made using the plates illustrated in FIG. 1(a) simply by adjusting the relative separation of the arrays of square wells along both direction of two different lattice vectors before pressing the plates together and solidifying the particle material. The absence of a relative displacement of the arrays of square depressions on the patterned surfaces yields a plurality of block-shaped particles, an example of which is shown in FIG. 3(a). A small relative displacement of a first array of square wells on a first patterned surface relative to a second identical array of square wells on a second patterned surface yields a plurality of flange-like particles each of which has flanges along two orthogonal directions and a small aspect ratio of length to width, an example of which is shown in FIG. 3(b). A larger relative displacement of one array with respect to the other yields a plurality of flange-like particles each of which has flanges along two orthogonal directions and a larger aspect ratio, an example of which is shown in FIG. 3(c). Thus, the local surface relief features etched on the first and second patterned surfaces are only partially important in determining the final shape of the particles; at least some aspect of the final shape of the particles is determined by the relative position and orientation of the first and the second patterned surfaces.

Figure 4A:
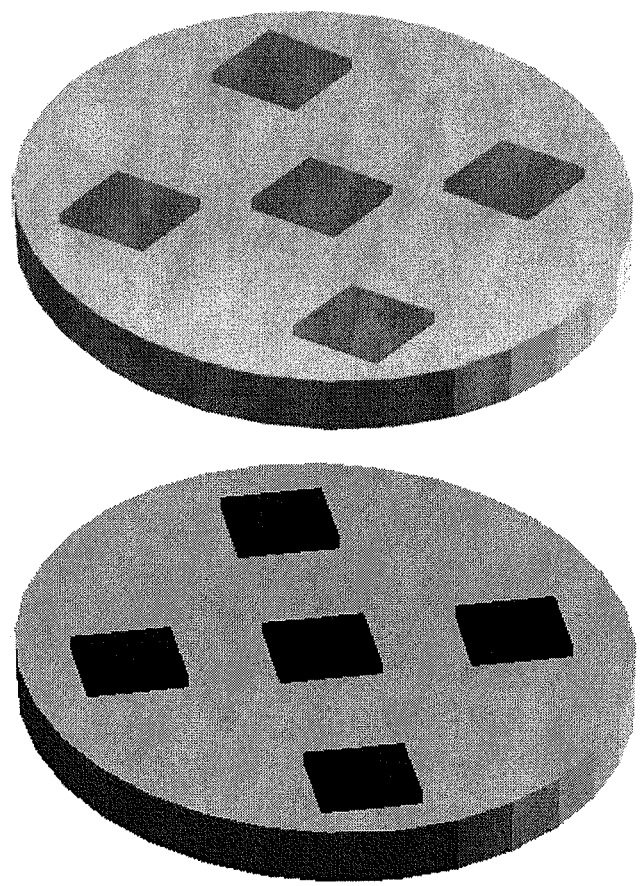
FIG. 4(a) is a schematic illustration of a first patterned surface on a first substrate and a second patterned surface on a second substrate suitable for making custom-shaped particles, according to an embodiment of the current invention. As shown, the first patterned surface has a square array of a plurality of square wells that are oriented so that the edges of the square wells lie along the first and second lattice directions, and the second patterned surface has a square array of a plurality of square wells that are oriented so that the edges of the square wells lie at a 45 degree angle with respect to the first and second lattice directions. The lattice basis vectors of the square arrays on both the first and second patterned surfaces are identical.
Figure 4B:
FIG. 4(b) is a schematic illustration of a custom-shaped particle produced using the first and second plates shown in FIG. 4(a), according to an embodiment of the current invention. In this example, the centers of the square wells on the first patterned surface have been aligned to be exactly in alignment with the centers of the 45-degree tilted square wells on the second patterned surface.
Figure 4C:
FIG. 4(c) is a schematic illustration of a custom-shaped particle produced using the first and second plates shown in FIG. 4(a), according to an embodiment of the current invention. In this example, the centers of the square wells on the first patterned surface have been offset with respect to the centers of the 45-degree tilted square wells on the second patterned surface.
Figure 4D:
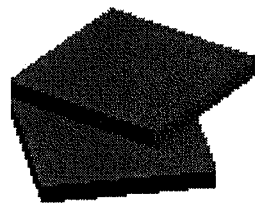
FIG. 4(d) is a schematic illustration of a custom-shaped particle produced using the first and second plates shown in FIG. 4(a), according to an embodiment of the current invention. In this example, the centers of the square wells on the first patterned surface have been offset to a greater degree than that shown in FIG. 4(c) with respect to the centers of the 45-degree tilted square wells on the second patterned surface.

Example Embodiment #4
Producing Custom-Shaped Particles Using Two Different Patterned Surfaces According to another embodiment of the current invention, desired particle shapes can be obtained by creating a first patterned surface on a first plate that has a square array characterized by orthogonal lattice basis vectors yet rotated orientations of the local surface relief features (e.g. square wells) with respect to the lattice basis vectors. As shown in FIG. 4(a), a first patterned surface on a first plate has square wells rotated at a 45° angle with respect to one of the lattice directions on the first patterned surface. If the first patterned surface is positioned and oriented so that the centers of the array of local surface relief features on the first and second patterned surfaces are in direct alignment, and the first and second patterned surfaces are pressed together to make contact, then the particles formed in the void-like regions would resemble flanged star-like particles, an example of which is shown in FIG. 4(b). If the first patterned surface is displaced along one lattice direction relative to the second patterned surface, then the particles formed would resemble pointed flange-like particles, an example of which is shown in FIG. 4(c). If the first patterned surface is displaced along both lattice directions relative to the second patterned surface, then the particles formed would resemble complex pointed flange-like particles, and example of which is shown in FIG. 4(d). Typically, a desired particle shape can be produced by controlling the relative alignment of the two patterned surfaces on the two plates, not only on the shapes of the local discrete surface relief features.

Figure 5A:
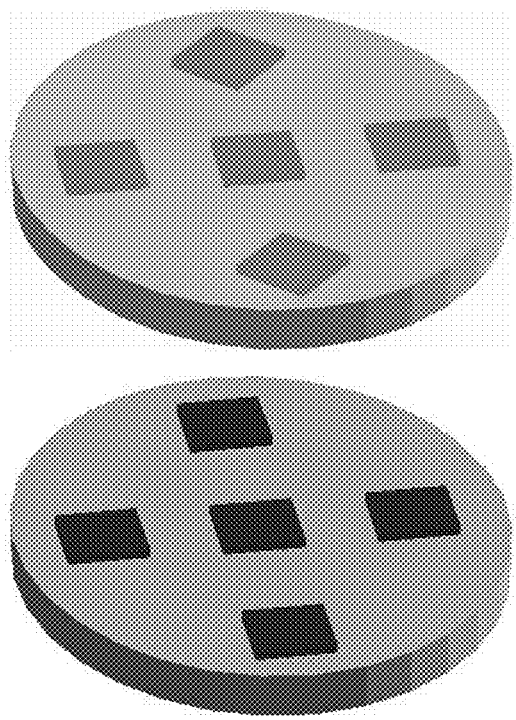
FIG. 5(a) is a schematic illustration of a first patterned surface on a first substrate and a second patterned surface on a second substrate suitable for making custom-shaped particles, according to an embodiment of the current invention. As shown, the first patterned surface has a square array of a plurality of square wells that are oriented so that the edges of the square wells lie along the first and second lattice directions, and the second patterned surface has a square array of a plurality of square wells, some of which are oriented along the first and second lattice directions, and some of which are oriented so that the edges of the square wells lie at a 45 degree angle with respect to the first and second lattice directions. The lattice basis vectors of the square arrays on both the first and second patterned surfaces are identical.
Figure 5B:
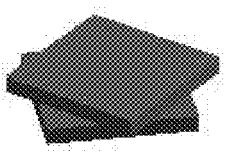
FIG. 5(b) is a schematic illustration of two different custom-shaped particles produced using the first and second plates shown in FIG. 5(a), according to an embodiment of the current invention. In this example, the centers of the square wells on the first patterned surface have aligned to be exactly opposite the centers of the square wells on the second patterned surfaces. The differences in the orientations of the square wells on the second patterned surface produce two different desired shapes from the same process. By controlling, for example, the relative number of tilted to aligned square well features on the second patterned surface, the relative number of particles having different shapes can be controlled.
Figure 5B:
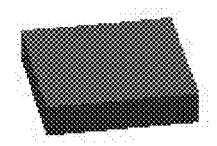

Example #5
Producing Custom-Shaped Particles Using Two Different Patterned Surfaces that have a Variety of Local Surface Relief Features According to another embodiment of the current invention, it is not necessary to create identical surface relief features on either of the first or second patterned surfaces on the first and second plates, and it can be desirable to create different surface relief features on the patterned surfaces of the first and/or second plates in order to obtain a desired diversity of particle shapes. For example, by positioning a plurality of different local surface relief features in a regular array on a patterned surface, the surface relief features can be varied in a desired manner, leading to the release of a plurality of particles that have several different shapes, rather than only one uniform shape. As shown in FIG. 5(a), a portion of the square depressions in the first patterned surface are oriented with edges along a lattice direction and a portion of the square depressions in the first patterned surface are oriented at a 45° angle with respect to one of the lattice directions. All of the square depressions in the second patterned surface are oriented with edges along a lattice direction. When the lattice on the first patterned surface is aligned to coincide with the lattice on the second patterned surface and the two patterned surfaces are brought into contact, a plurality of particles having two different shapes, examples of which are shown in FIG. 5(b), can be produced simultaneously. According to an embodiment of the current invention, all of the shapes that are desired as parts for a device can be produced at the correct ratio and proximity to facilitate the assembly of these parts in a process subsequent to release of the particles into a fluid material.

Figure 6A:
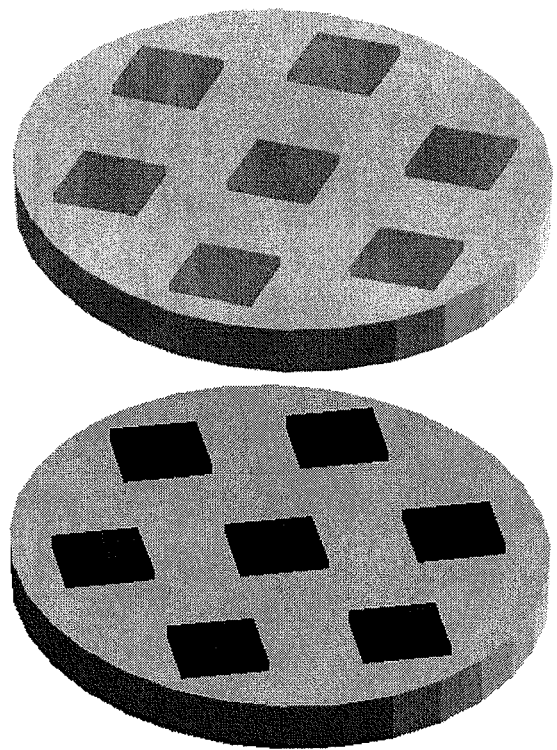
FIG. 6(a) is a schematic illustration of a first patterned surface on a first substrate and a second patterned surface on a second substrate suitable for making custom-shaped particles, according to an embodiment of the current invention. As shown, the lattice basis vectors for a hexagonal lattice are not orthogonal, and the first patterned surface has a hexagonal array of a plurality of square wells that are oriented so that the edges of the square wells lie along a first lattice directions but not along a second. As shown, the second patterned surface has an identical hexagon array of a plurality of square wells as the first patterned surface, and the second patterned surface has been rotated 60 degrees with respect to the edges of the squares on the first patterned surface. In this example, the lattice basis vectors for the hexagonal lattice on the first patterned surface are identical to the lattice basis vectors for the hexagonal lattice on the second patterned surface.
Figure 6B:
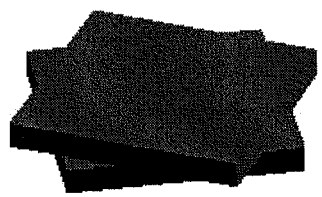
FIG. 6(b) is a schematic illustration of a custom-shaped particle produced using the first and second plates shown in FIG. 6(a), according to an embodiment of the current invention. In this example, the centers of the square wells in a hexagonal array on the first patterned surface have been aligned to be exactly opposite the centers of the square wells in a hexagonal array on the second patterned surface, which has been rotated 60 degrees as described in FIG. 6(a).

Example Embodiment #6
Producing Custom-Shaped Particles Having a Variety of Particle Shapes By Rotational Alignment of Two Patterned Surfaces According to an embodiment of the current invention, two identical patterned surfaces are fabricated on a first plate and a second plate; each plate has a patterned surface that consists of a hexagonal array of surface relief features that are square depressions, as shown in FIG. 6(a). As illustrated in this example, by aligning the centers of the two plates so that the central lattice positions coincide and by rotating one plate relative to the other plate by 60°, it is possible to make the centers of the lattice positions of square depressions on the first patterned surface coincide with the centers of the lattice positions of square depressions on the second patterned surface. However, after the relative rotation, the edges of the square depressions on the first patterned surface are no longer aligned with the edges of the square depressions on the second patterned surface. As a result of this rotational approach, it is possible to also produce a plurality of uniform star-like flange particles, an example of which is shown in FIG. 6(b), using two identical plates rather than a more restricted range of particles resulting only from positional alignment. Typically, in some embodiments of the particle production process, employing a combination of relative alignment consisting of a relative rotation and a relative positioning of a first patterned surface with respect to a second patterned surface provides a capacity to produce a very broad variety particle shapes.

Additional Embodiments

Figure 7:
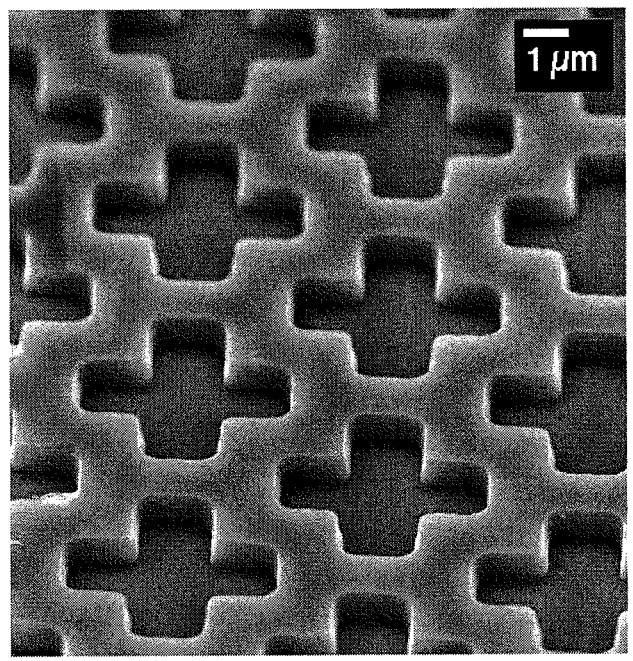
FIG. 7 is a scanning electron micrograph of a portion of a patterned surface having relief features suitable for making particles, according to an embodiment of the current invention. The patterned relief surface, which is produced through a standard lithographic process for patterning and etching a polished surface of a silicon wafer, contains a repeating array (i.e. lattice) of cross-shaped wells on a flat surface of a silicon wafer. The repeating array of these wells follows a hexagonal pattern to increase the particle production per unit area. The patterned surface may also have larger fiducial alignment marks at certain locations to facilitate alignment of a first patterned surface with respect to a second patterned surface by an automatic alignment system.

According to an embodiment of the current invention, an example of a patterned surface of a silicon wafer is shown in FIG. 7. A hexagonal array of local surface relief feature in the form of square-cross wells has been etched into the surface of a silicon wafer. Many millions of wells are present on the surface of a single wafer.

Figure 8:
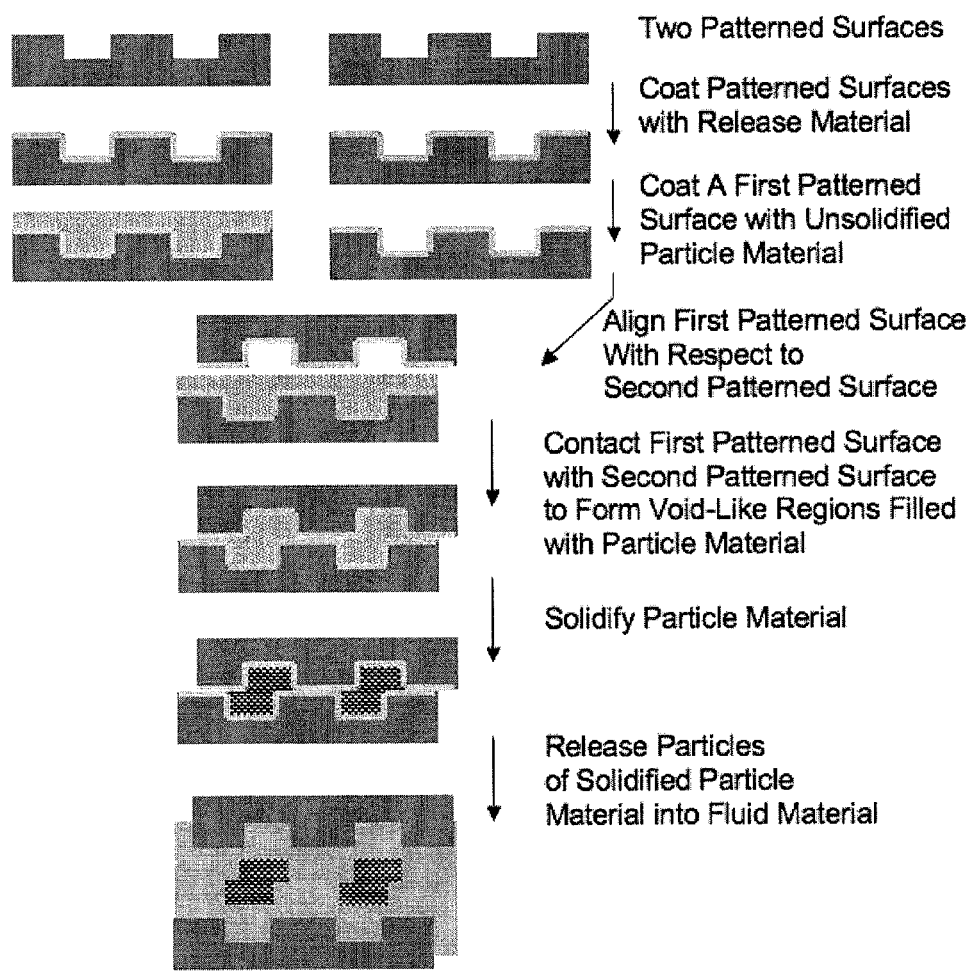
FIG. 8 is a schematic illustration (side view in cross-section) of a process for making custom-shaped particles, according to an embodiment of the current invention. A first patterned surface on a first substrate and a second patterned surface on a second substrate are designed with surface features that can be used to produce the desired particle shapes. A release material, which can facilitate subsequent release of particles from the patterned surfaces, is deposited on each of the patterned surfaces. Typically, the thickness of the release material deposited is significantly less than the lateral dimensions and depth of geometrical relief features that have been patterned into the first and second surfaces. A particle material is deposited on the release material that has been previously deposited on the first patterned surface. The second patterned surface is inverted and moved into proximity with the first patterned surface. The second patterned surface is aligned relative to the first patterned surface to produce the desired displacement of geometrical relief features on the first patterned surface with respect to the second patterned surface, reflecting the desired particle shape. The first patterned surface is brought into contact (or near-contact) with the second patterned surface, forming a plurality of void-like regions that are filled with particle material. Any excess particle material that does not fill these void-like regions is expelled from between the first and second patterned surfaces as they are brought into contact. Typically, the volume of particle material and its distribution are adequate to substantially fill most if not all of the plurality of void-like regions with particle material. Subsequently, the particle material is solidified so that an elastic modulus of the material is increased substantially, thereby creating a plurality of discrete solid particles that have shapes determined by a combination of geometrical relief features on the first patterned surface, geometrical relief features on the second patterned surface, and the relative alignment of the geometrical relief features on the first patterned surface with respect to the geometrical relief features on the second patterned surface. The first patterned surface is separated from the second patterned surface, and the plurality of custom-shaped particles is separated from the first patterned surface and the second patterned surface into a fluid material. Typically, the fluid material containing the particles is then separated from the first patterned surface on the first substrate and also from the second patterned surface on the second substrate. Typically, the release material is soluble in the fluid material. Optionally, the first patterned surface and the second patterned surface can be cleaned and re-used to make additional custom-shaped particles.

An embodiment of a process for producing custom-shaped particles according to the current invention is shown schematically in FIG. 8. A release material has been coated over the first and second patterned surfaces to facilitate the subsequent release of the solid particles into a fluid material.

Figure 9:
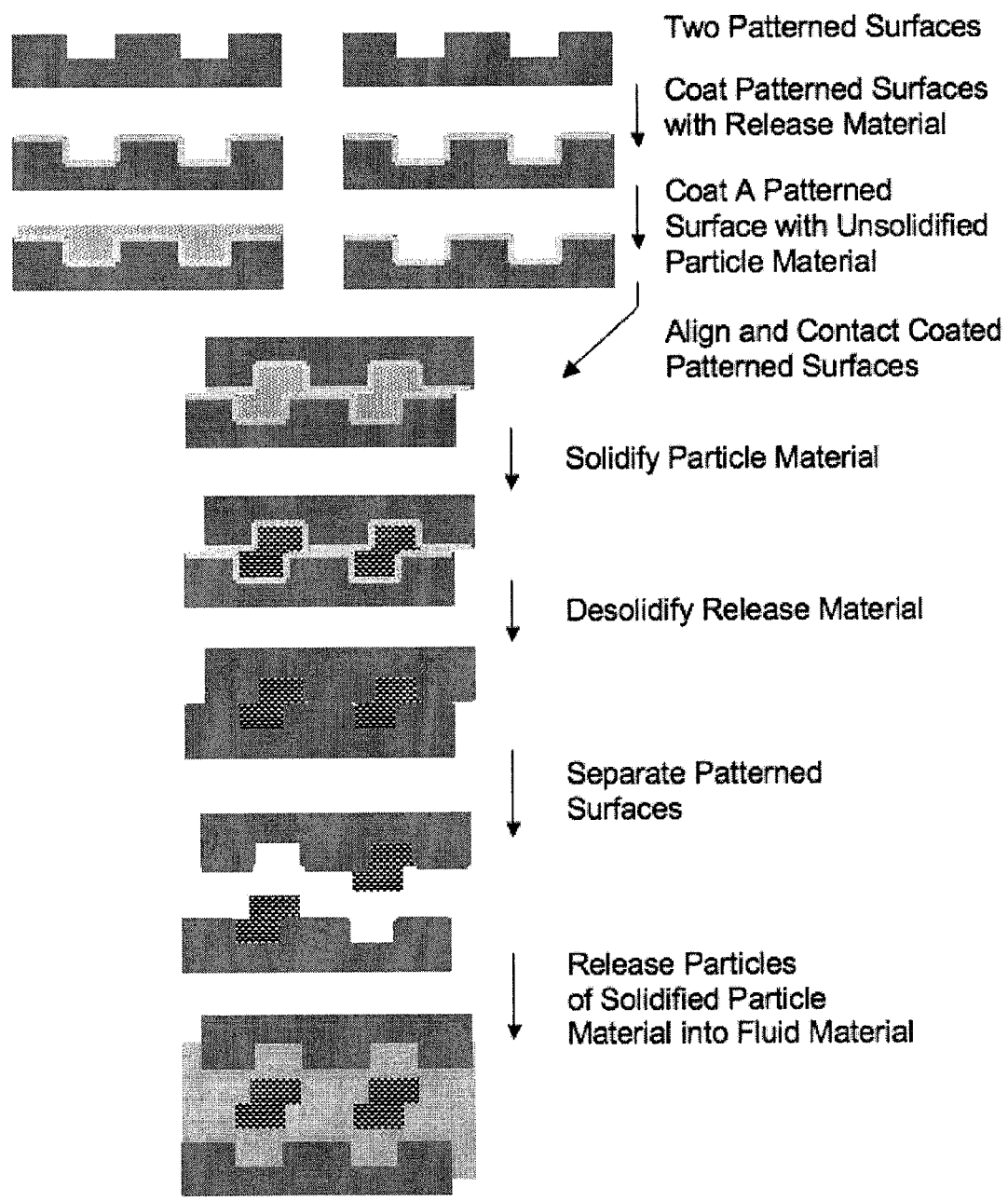
FIG. 9 is a schematic illustration (side view in cross-section) of a process for making custom-shaped particles, according to an embodiment of the current invention. A first patterned surface on a first substrate and a second patterned surface on a second substrate are designed with surface features that can be used to produce the desired particle shapes. A solid release material, which can facilitate subsequent release of particles from the patterned surfaces, is deposited on each of the patterned surfaces. Typically, the thickness of the release material deposited is significantly less than the lateral dimensions and depth of geometrical relief features that have been patterned into the first and second surfaces. A particle material is deposited on the release material that has been previously deposited on the first patterned surface. The second patterned surface is inverted and moved into proximity with the first patterned surface. The second patterned surface is aligned relative to the first patterned surface to produce the desired displacement of geometrical relief features on the first patterned surface with respect to the second patterned surface, reflecting the desired particle shape. The first patterned surface is brought into contact (or near-contact) with the second patterned surface, forming a plurality of void-like regions that are filled with particle material. Because the first and second surfaces have been coated with release material, bringing the first and second patterned surfaces into contact can also effectively mean contacting the release material deposited onto the first patterned surface with the release material deposited onto the second patterned surface. Any excess particle material that does not fill these void-like regions is expelled from between the first and second patterned surfaces as they are brought into contact. Typically, the volume of particle material and its distribution are adequate to substantially fill most if not all of the plurality of void-like regions with particle material. Because the first and second surfaces have been coated with release material, bringing the first and second patterned surfaces into contact can also effectively mean contacting the release material deposited onto the first patterned surface with the release material deposited onto the second patterned surface. Subsequently, the particle material is solidified so that an elastic modulus of the material is increased substantially, thereby creating a plurality of discrete solid particles that have shapes determined by a combination of geometrical relief features on the first patterned surface, geometrical relief features on the second patterned surface, and the relative alignment of the geometrical relief features on the first patterned surface with respect to the geometrical relief features on the second patterned surface. In order to facilitate separation of the first patterned surface from the second patterned surface, the release material is desolidified by at least one of a physical (e.g. a temperature change) and a chemical process (e.g. a chemical reaction). The first patterned surface is separated from the second patterned surface, and the plurality of custom-shaped particles is separated from the first patterned surface and the second patterned surface into a fluid material. Typically, the fluid material containing the particles is then separated from the first patterned surface on the first substrate and also from the second patterned surface on the second substrate. Typically, the release material is soluble in the fluid material. Optionally, the first patterned surface and the second patterned surface can be cleaned and re-used to make additional custom-shaped particles.

An embodiment of a process for producing custom-shaped particles according to the current invention is shown schematically in FIG. 9. A solid release material has been coated over the first and second patterned surfaces to facilitate the subsequent release of the solid particles into a fluid material. The release material is desolidified after solidification of the particle material, thereby facilitating subsequent separation of the first patterned surface from the second patterned surface and subsequent release of particles from the first and second patterned surfaces.

Figure 10:
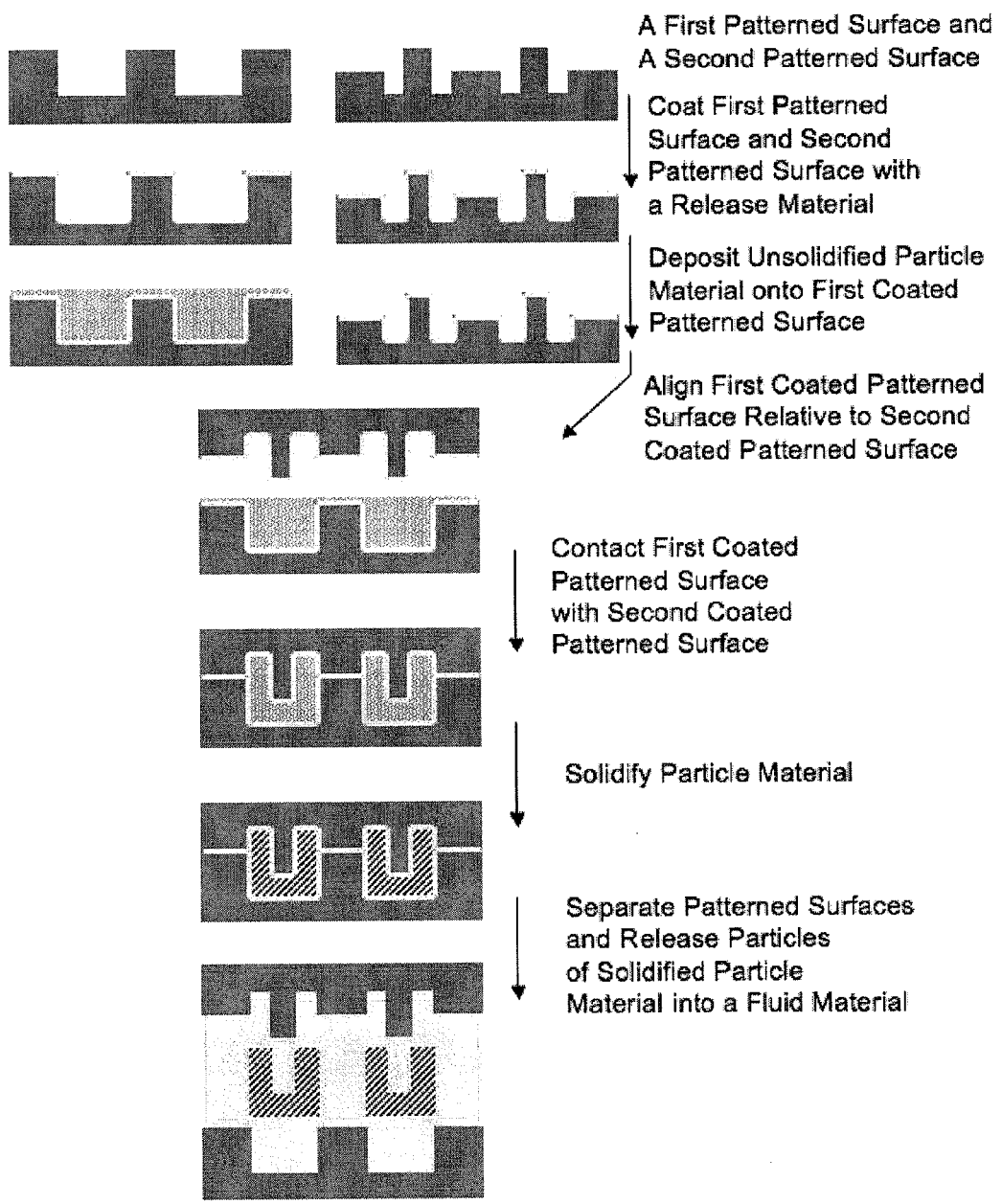
FIG. 10 is a schematic illustration (side view in cross-section) of a process for making custom-shaped particles, according to an embodiment of the current invention. This example is similar to the one shown in FIG. 8 and described in the brief description of FIG. 8, except that the geometrical relief features in the second patterned surface contain a combination of both positive and negative relief features (i.e. both projections such as pillars and depressions such as wells). A periodic array of projections on the second patterned surface has been designed to fit inside a periodic array of depressions on the first patterned surface. Alignment of the first patterned surface relative to the second patterned surface enables the positive relief features on the first surface to fit into the negative relief features on the first surface, thereby creating a plurality of discrete void-like regions filled with particle material that are defined by a combination of positive relief and negative relief features. The shapes of the plurality of particles produced by solidification and released after solidification of the particle material into a fluid material are therefore defined by a combination of positive and negative relief features on the second patterned surface, negative relief features on the first patterned surface, and the relative alignment of the first patterned surface relative to the second patterned surface. The choice of alignment of the first patterned surface with respect to the second patterned surface is critical in this example, since not every relative position of the first patterned surface with respect to the second patterned surface will create a plurality of discrete void-like regions filled with particle material.

An embodiment of a process for producing custom-shaped particles according to the current invention is shown schematically in FIG. 10. A positive local surface relief feature present on a patterned surface can be used to make particles according to an embodiment of the current invention, provided positive local surface relief features on one patterned surface are aligned and inserted into the voids of negative local surface relief features on the other patterned surface.

Figure 11:
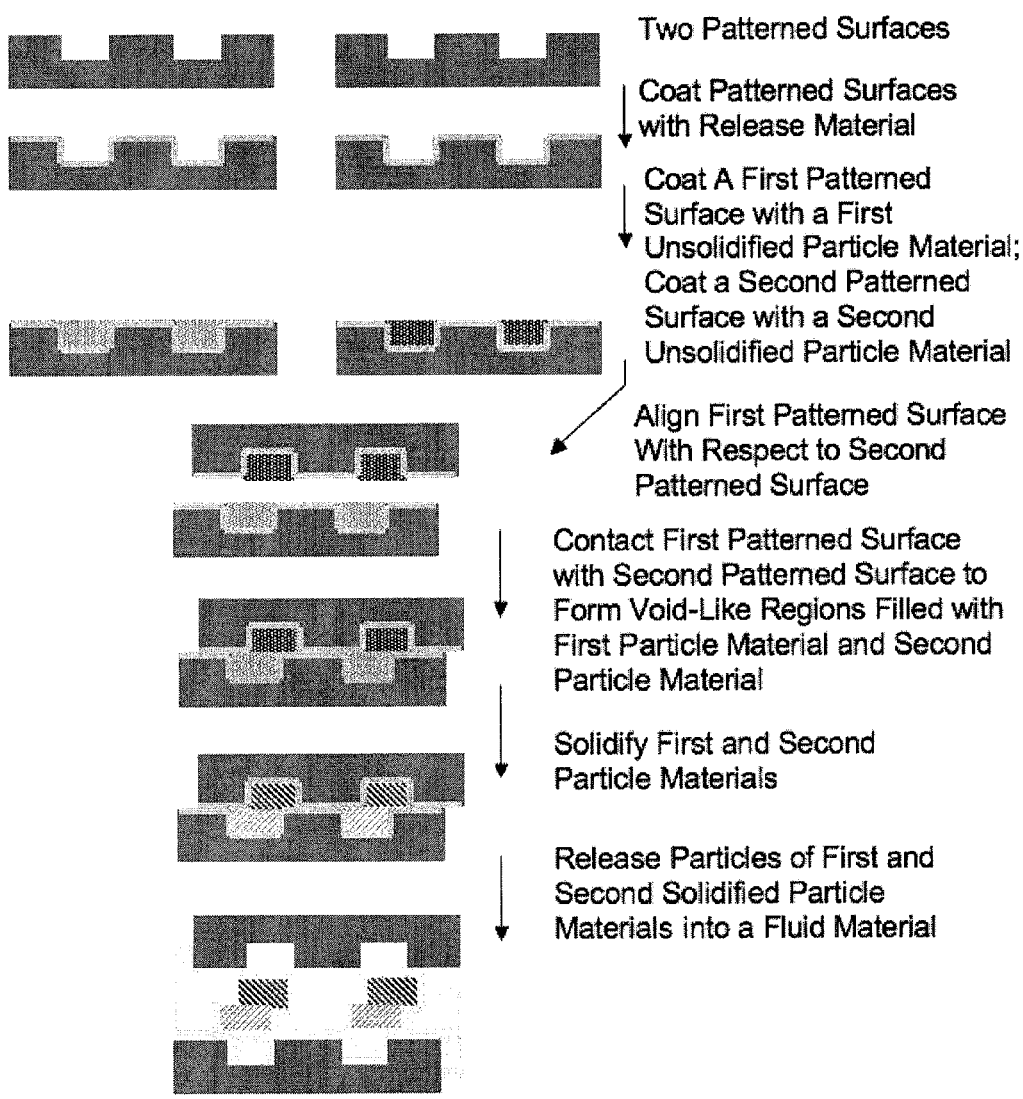
FIG. 11 is a schematic illustration (side view in cross-section) of a process for making custom-shaped particles, according to an embodiment of the current invention. A first patterned surface on a first substrate and a second patterned surface on a second substrate are designed with surface features that can be used to produce the desired particle shapes. A release material, which can facilitate subsequent release of particles from the patterned surfaces, is deposited on each of the patterned surfaces. Typically, the thickness of the release material deposited is significantly less than the lateral dimensions and depth of geometrical relief features that have been patterned into the first and second surfaces. A first particle material is deposited on the release material that has been previously deposited on the first patterned surface. A second particle material is deposited on the release material that has been previously deposited on the second patterned surface. The second patterned surface is positioned so that the second patterned surface is facing the first patterned surface. The second patterned surface is moved into proximity with the first patterned surface. The second patterned surface is aligned relative to the first patterned surface to produce the desired displacement of geometrical relief features on the first patterned surface with respect to the second patterned surface, reflecting the desired particle shape. The first patterned surface is brought into contact (or near-contact) with the second patterned surface, forming a plurality of void-like regions that are filled with a first particle material and a second particle material. Any excess particle material that does not fill these void-like regions is expelled from between the first and second patterned surfaces as they are brought into contact. Subsequently, at least one of the first particle material and second particle material is solidified so that an elastic modulus of a particle material is increased substantially, thereby creating a plurality of discrete solid custom-shaped particles comprised of at least one of a first particle material and a second particle material that have shapes determined by a combination of geometrical relief features on the first patterned surface, geometrical relief features on the second patterned surface, and the relative alignment of the geometrical relief features on the first patterned surface with respect to the geometrical relief features on the second patterned surface. A fluid material is contacted with the release material and the first patterned surface is separated from the second patterned surface. The plurality of custom-shaped particles is separated from the first patterned surface and the second patterned surface into a fluid material. Typically, the fluid material containing custom-shaped particles is then separated from the first patterned surface on the first substrate and also from the second patterned surface on the second substrate. Typically, the release material is soluble in the fluid material. Optionally, the first patterned surface and the second patterned surface can be cleaned and re-used to make additional custom-shaped particles.

An embodiment of a process for producing custom-shaped particles according to the current invention is shown schematically in FIG. 11. A first and a second particle material can be deposited on a first and a second patterned surface, respectively. After solidification of at least one of a first and a second particle material, the resulting particles formed and subsequently released are composed of at least one of the first and second particle materials.

Figure 12:
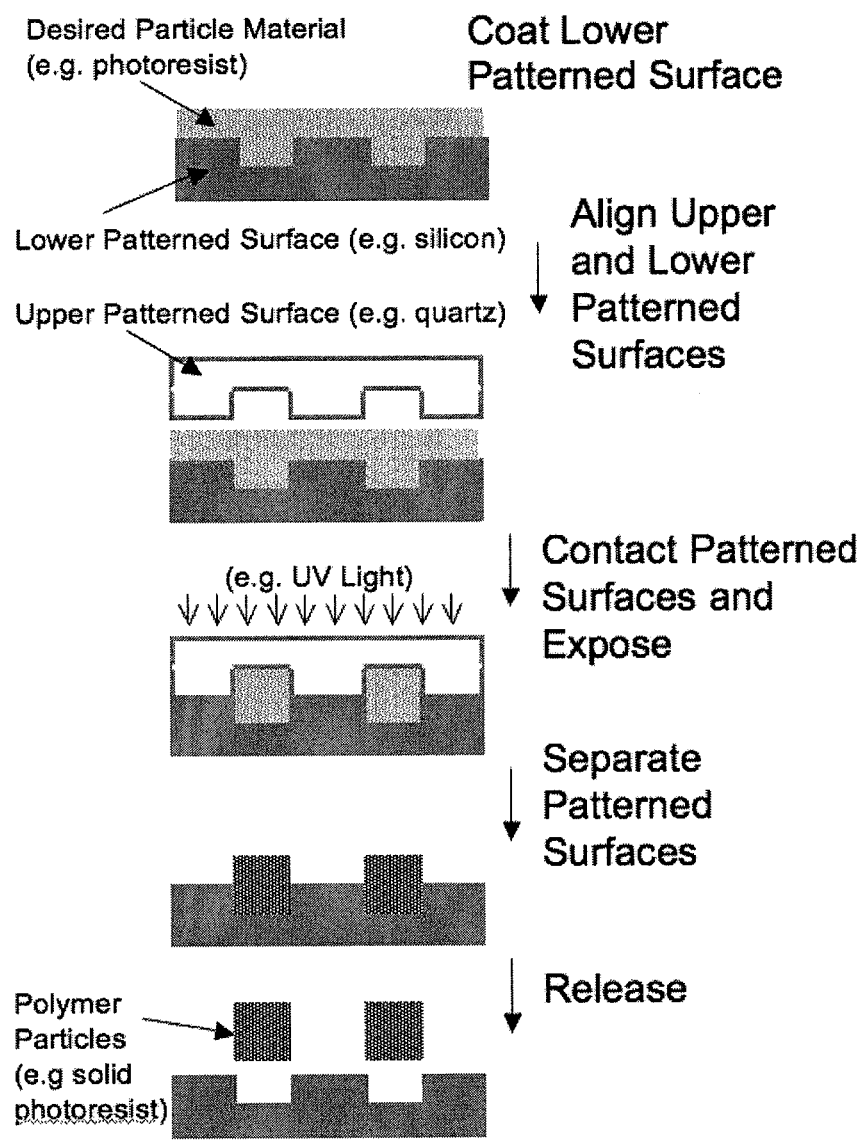
FIG. 12 is a schematic illustration (side view in cross-section) of a process for making custom-shaped particles, according to an embodiment of the current invention. A first patterned surface (e.g. a first array of square wells) on a first substrate (e.g. a silicon wafer), which can define a portion of a surface of the desired particles, is designed and fabricated. The first patterned surface is also referred to as the lower patterned surface in the schematic illustration. A second patterned surface (e.g. a second array of square wells) on a second radiation-transparent substrate (e.g. a quartz plate), which can define a portion of a surface of the desired particles, is designed and fabricated. The second patterned surface is also referred to as the upper patterned surface in the schematic illustration. A radiation-sensitive particle material (e.g. unexposed liquid photoresist) is deposited onto the first patterned surface. The second patterned surface is arranged to face the first patterned surface, the second patterned surface is aligned relative to the first patterned surface (e.g. such that wells on the first patterned surface are directly opposite wells on the second patterned surface), and the first patterned surface is contacted with the second patterned surface, thereby creating a plurality of discrete void-like regions filled with radiation-sensitive material. The radiation-sensitive material in the plurality of discrete void-like regions is exposed to adequate dose of radiation to solidify the radiation-sensitive material, thereby creating a plurality of custom-shaped particles that reflect a combination of the surface relief features on the first patterned surface, the surface relief features on the second patterned surface, and the relative alignment of the first patterned surface with respect to the second patterned surface. The second patterned surface is separated from the first patterned surface, and the plurality of custom-shaped particles is released from the patterned surfaces into a fluid material. In this example, the solidification of the particle material is accomplished by exposure to radiation through a patterned surface that is substantially transparent to said radiation. In the example shown for a photoresist material, the radiation is electromagnetic radiation at a wavelength suitable for causing a photochemical reaction in the photoresist material. Optionally, agitation of the fluid material can be used to facilitate the release of custom-shaped particles.

An embodiment of a process for producing custom-shaped particles according to the current invention is shown schematically in FIG. 12. A patterned surface that is transparent to a form of radiation is employed to enable solidification of a radiation-sensitive particle material between the first and second patterned surfaces. In the example shown, the local surface relief features of a transparent patterned surface and a non-transparent patterned surface are aligned.

Figure 13:
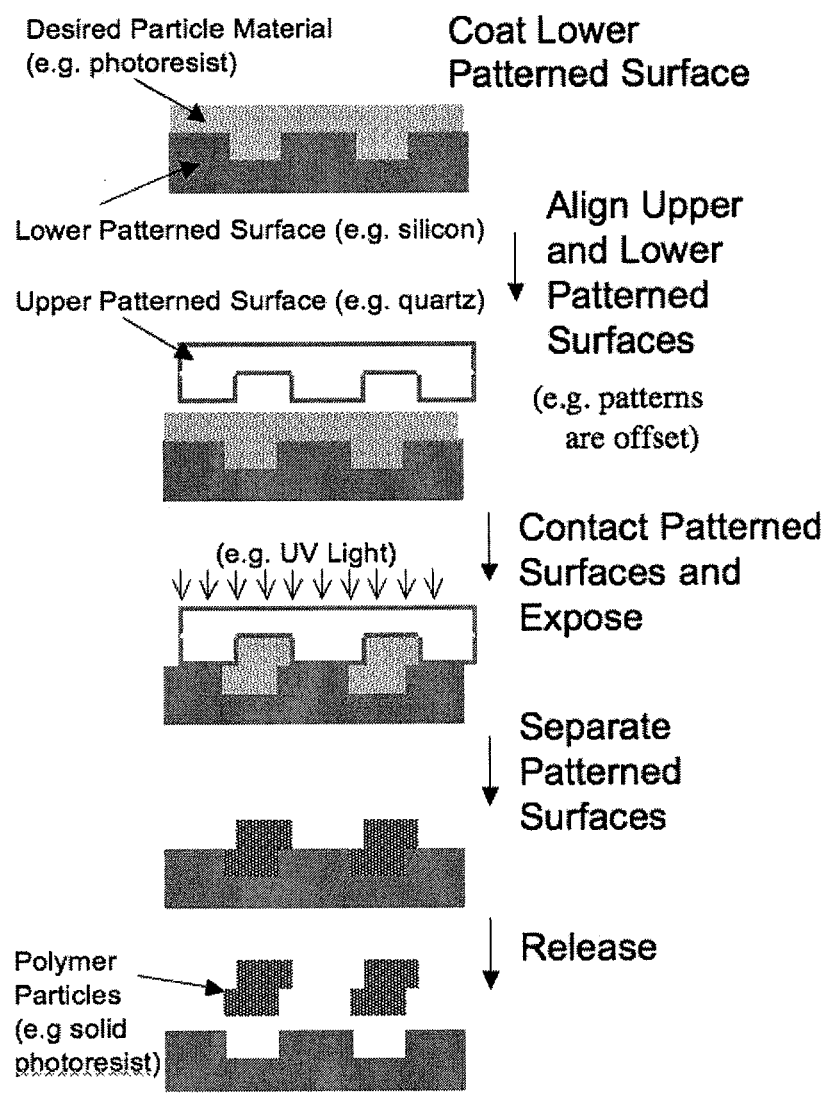
FIG. 13 is a schematic illustration (side view in cross-section) of a process for making custom-shaped particles, according to an embodiment of the current invention. This example is similar to the process illustrated and described in FIG. 12, except that the surface relief features (e.g. wells) one the second patterned surface are offset with respect to the surface relief features (e.g. wells) on the first patterned surface. This offset is chosen to produce a desired geometrical feature of a custom-shaped particle.

An embodiment of a process for producing custom-shaped particles according to the current invention is shown schematically in FIG. 13. A patterned surface that is transparent to a form of radiation is employed to enable solidification of a radiation-sensitive particle material between the first and second patterned surfaces. In the example shown, the local surface relief features of a transparent patterned surface and a non-transparent patterned surface are offset.

Figure 14:
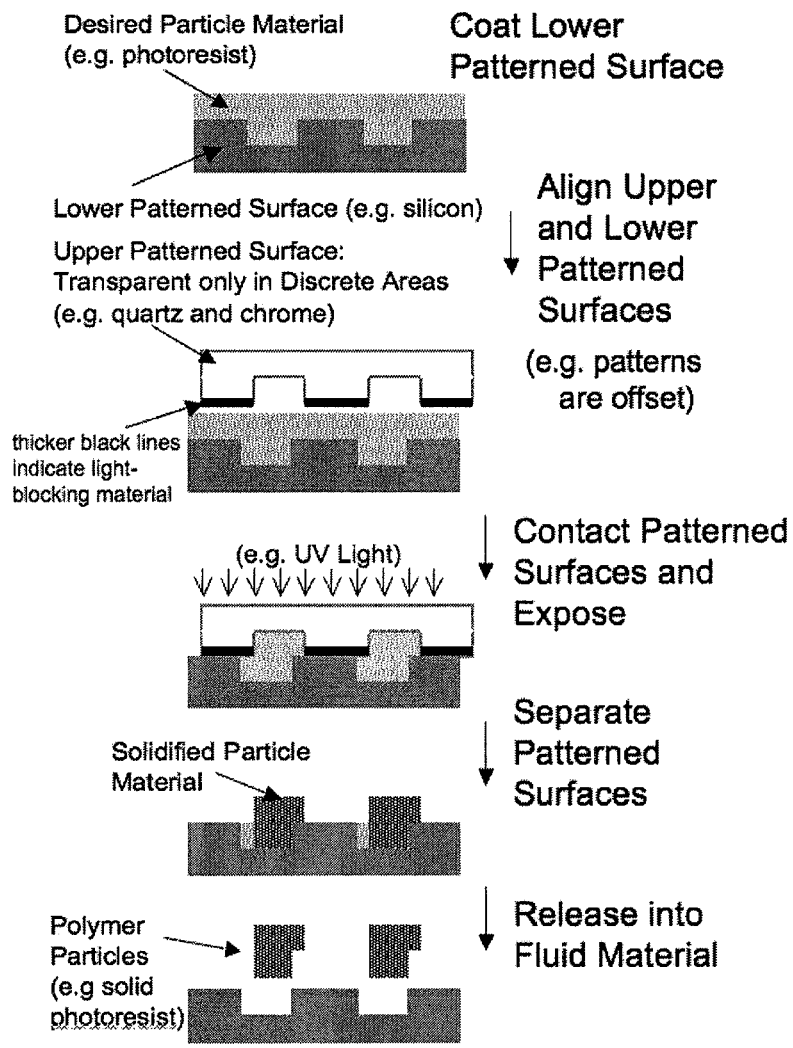
FIG. 14 is a schematic illustration (side view in cross-section) of a process for making custom-shaped particles, according to an embodiment of the current invention. This example is similar to the process illustrated and described in FIGS. 13 and 14, except that the second patterned surface (e.g. array of square wells) on the second radiation-transparent substrate contains a radiation-blocking material over a portion of its surface that prevents exposure of radiation sensitive material outside of the well-like regions but allows exposure of at least a portion of the radiation sensitive material inside the well-like regions. For sufficiently collimated radiation, offsetting the second patterned surface containing radiation-blocking regions with respect to the first patterned surface provides additional control over the particle shape, since the radiation can be blocked from solidifying a portion of the radiation-sensitive material that fills the plurality of discrete void-like regions that are formed when the first patterned surface is contacted with the second patterned surface. The custom-shaped particle produced contain geometrical features imparted by a combination of the geometrical relief features on the first patterned surface, the geometrical features on the second patterned surface, the relative alignment of the second patterned surface with respect to the first patterned surface, and the pattern of radiation-blocking material (e.g. light blocking material) on the second patterned surface.

An embodiment of a process for producing custom-shaped particles according to the current invention is shown schematically in FIG. 14. A patterned surface that is partially transparent to a form of radiation is employed to enable solidification of a radiation-sensitive particle material between the first and second patterned surfaces. A radiation-blocking material is present over certain portions of the transparent patterned surface and blocks incident radiation, thereby partially controlling the shapes of particles produced. In the example shown, the local surface relief features of a transparent patterned surface and a non-transparent patterned surface are offset.

Some Advantages of Aligned Pattern Templating as a Mechanical Process for Producing Custom-Shaped Particles The aligned pattern templating process (e.g. also referred to as a two-patterned-plate imprinting process) can offer the following non-obvious advantages for producing particles over a single-patterned-plate imprinting method: (1) Particle shapes are determined at least in part and can be controlled by the relative alignment (i.e. relative position and relative orientation) of the first patterned surface on the first plate with respect to the second patterned surface on the second plate. (2) The same two plates can be used to print a higher diversity of shapes through the process of alignment of the surface relief features on the first patterned surface of the first plate with respect to the surface relief features on the second patterned surface of the second plate. (3) The particle shapes can be precisely prescribed and obtained through relative position and relative orientation of the first and the second patterned surfaces. (4)

Aligned two-patterned-plate imprinting provides access to a greater range of complex shapes that can be released from the patterned surfaces than single-patterned plate imprinting methods. Certain complex-shaped particles created by single-patterned-plate imprinting methods would remain stuck (i.e. mechanically trapped) in the patterned surface of the single plate, precluding release. (5) The same two patterned surfaces of the same two plates can be repeatedly re-used in the two-patterned-plate imprinting process to produce particles that have a wide range of different shapes depending upon the relative alignment of the plates. (6) Surface relief features on one of the plates can be positive relief to provide additional complexity to resulting particle shapes through the insertion of a positive relief feature (e.g. a pillar) on the first patterned surface of the first plate into a non-obstructed negative surface relief feature (e.g. a well) that is capable of receiving it on the second patterned surface of the second plate during the imprinting process. (7) Using at least one optically transparent plate can facilitate solidification of the particle material through photosensitive chemical reactions induced by applied beams of photons.

According to some embodiments of the current invention, aligning a first patterned surface with respect to a second patterned surface for the purposes of making custom-shaped particles provides significant and non-obvious advantages over other particle production methods. Although our focus has been primarily on creating discrete sub-millimeter particles using this method, according to some embodiments of the current invention, a similar process can be used to create continuous structures that have maximum dimensions exceeding a millimeter.

According to an embodiment of the current invention, a particle material can contain a solvent that can be removed by evaporation in order to cause the solidification of the particle material, potentially with a compression (i.e. reduction in size) of the produced particles compared to the boundaries of the void-like regions, thereby facilitating subsequent release of the particles from the patterned surfaces.

While the invention has been described and illustrated with reference to certain particular embodiments thereof, those skilled in the art will appreciate that various adaptations, changes, modifications, substitutions, deletions, or additions of procedures and protocols may be made without departing from the spirit and scope of the invention. It is intended, therefore, that the invention be defined by the scope of the claims that follow and that such claims be interpreted as broadly as is reasonable.

I claim:

1. A method for producing particles, comprising:
providing a first patterned surface having a first surface relief pattern adapted to impart structure to a plurality of particles while they are under production;
providing a second patterned surface having a second surface relief pattern adapted to impart structure to a plurality of particles while they are under production;
depositing a particle material in contact with at least one of said first patterned surface and said second patterned surface;
aligning said first surface relief pattern on said first patterned surface with respect to said second surface relief pattern on said second patterned surface;
contacting at least a portion of said first patterned surface with at least a portion of said second patterned surface;
solidifying at least a portion of said particle material to form a plurality of particles; and
separating at least a portion of said plurality of particles from at least one of said first patterned surface and said second patterned surface,
wherein at least a portion of a structure of each of said plurality of particles is imparted by a combination of said first surface relief pattern and said second surface relief pattern.

2. A method of producing particles according to claim 1, wherein at least a portion of a structure of each of said plurality of particles is imparted by said aligning.

3. A method of producing particles according to claim 1, further comprising depositing a release material onto at least a portion of one of said first patterned surface and said second patterned surface to facilitate said separating, prior to said depositing said particle material.

4. A method of producing particles according to claim 1, wherein said depositing is at least one of a spin-coating, a spray-coating, an injection, a flowing, a dip-coating, a sputtering, a vapor condensation, a chemical vapor deposition, a physical vapor deposition, a laser ablation deposition, a molecular beam epitaxy, an electro-coating, and an electron-beam metal evaporation.

5. A method of producing particles according to claim 1, wherein each of said plurality of particles has a maximum spatial dimension that is less than about one millimeter.

6. A method of producing particles according to claim 1, wherein said particle material is at least one of a radiation-sensitive material, a thermally-sensitive material, a viscous material, a viscoelastic material, a viscoplastic material, an oligomeric material, a reactive material, a particulate suspension, a molecular solution, a sol, a liquid crystal, a lyotropic phase, a gel, a powder, a paste, an emulsion, a nanoemulsion, a biologically compatible material, a biologically degradable material, a biologically active material, a biologically inert material, and a crosslinkable material.

7. A method of producing particles according to claim 3, further comprising desolidifying said release material prior to said separating.

8. A method of producing particles according to claim 1, wherein said separating further comprises contacting said plurality of particles with a fluid material to form a dispersion of said plurality of particles in said fluid material.

9. A method of producing particles according to claim 8, wherein said fluid material is at least one of a liquid, a Newtonian liquid, a viscoelastic liquid, a thixotropic liquid, a lyotropic liquid crystal, a thermotropic liquid crystal, an organic liquid, an inorganic liquid, a hydrocarbon liquid, a fluorocarbon liquid, a solution, an aqueous solution, a polymer solution, a biopolymer solution, a surfactant solution, a solution containing a stabilizing agent that inhibit aggregation of said plurality of particles, a solution containing a surface treatment agent, a dispersion, a nanoparticle dispersion, an emulsion, a nanoemulsion, a supercritical fluid, and a gas.

10. A method of producing particles according to claim 1, wherein at least one of said first surface relief pattern on said first patterned surface and said second surface relief pattern on said second patterned surface comprise a regular array of at least one of a negative surface relief feature, a positive surface relief feature, a well feature, a projection feature, and a flat surface-contact feature.

11. A method of producing particles according to claim 1, wherein said aligning further comprises at least one of a positioning, an orienting, a tilting, a tipping, a rotating, and a deforming of said first patterned surface with respect to said second patterned surface.

12. A method of producing particles according to claim 3, wherein said contacting said first patterned surface with said second patterned surface further comprises contacting said release material deposited on said first patterned surface with said release material deposited on said second patterned surface.

13. A method of producing particles according to claim 1, wherein said contacting said first patterned surface with said second patterned surface creates a plurality of disconnected regions containing said particle material bounded by said first patterned surface and said second patterned surface.

14. A method of producing particles according to claim 1, wherein at least one of said first surface relief pattern of said first patterned surface and said second surface relief pattern of said second patterned surface is substantially un-altered by said producing particles and is suitable for subsequent re-use in producing additional said particles.

15. A method of producing particles according to claim 1, further comprising combining said particle material prior to said depositing with at least one of a drug molecule, a nutrient molecule, a biodegradable polymer, a biodegradable biopolymer, a moisturizing molecule, a wax molecule, a non-volatile molecule, a polymeric material, an emulsion, a nanoemulsions, a surfactant, a detergent, a wetting agent, a microscopic particle, an atomic cluster, a molecular cluster, an organic particle, an inorganic particle, a metallic particle, a nanoparticle, an organic nanoparticle, an inorganic nanoparticle, a metallic nanoparticle, a quantum dot, a metal cluster, a ferromagnetic particle, a ferromagnetic nanoparticle, a paramagnetic particle, a paramagnetic nanoparticle, a reactive molecule, a radioactive isotope, a molecule containing a radioactive isotope, a particle containing a radioactive isotope, a nanoparticle containing a radioactive isotope, a radiation-reactive molecule, a derivatized molecule, a fluorescent molecule, a dye molecule, a biomolecule, a biologically active molecule, a protein, a lipid, a lipoprotein, a deoxyribonucleic acid, a ribonucleic acid, a single-stranded deoxyribonucleic acid oligomer, a partially single-stranded deoxyribonucleic acid oligomer, a peptide, a polypeptide, a copolypeptide, and any combination thereof.

16. A method of producing particles according to claim 3, wherein said release material comprises at least one of an organic material, a polymeric material, an oligomeric material, a resin material, an inorganic material, a metallic material, a hydrocarbon material, a fluorocarbon material, a surface modifier, a sacrificial material, a dissolvable material, a sublimable material, and a thermally meltable material.

17. A method of producing particles according to claim 1, wherein at least one percent of an area of said first surface relief pattern contains local surface relief features on said first patterned surface.

18. A method of producing particles according to claim 1, wherein said separating comprises at least one of a mechanical agitation, a vibration, an acoustic agitation, an ultrasonic agitation, a temperature change, and a fluid flow.

19. A method of producing particles according to claim 1, further comprising modifying at least a portion of a surface of at least a portion of said particles with a surface-modifying material having a predetermined chemical property by at least one of functionalizing, adsorbing, and coating said particles with said surface-modifying material.

20. A method of producing particles according to claim 1, wherein at least 1,000 particles of said plurality of particles are separated from said first patterned surface and said second patterned surface by said separating.

21. A method of producing particles according to claim 1, wherein said contacting said first patterned surface with said second patterned surface yields a plurality of disconnected regions between said first patterned surface and said second patterned surface that are suitable for structuring said plurality of particles.

22. A method of producing particles according to claim 1, wherein said aligning comprises offsetting a first periodic array of said first surface relief features with respect to a second periodic array of said second surface relief features, wherein the lattice basis vectors of the first periodic array are substantially the same as the lattice basis vectors of the second periodic array.

* * * * *

UNITED STATES PATENT AND TRADEMARK OFFICE
CERTIFICATE OF CORRECTION

PATENT NO. : 8,562,892 B2
APPLICATION NO. : 12/579226
DATED : October 22, 2013
INVENTOR(S) : Thomas G. Mason Page 1 of 1

It is certified that error appears in the above-identified patent and that said Letters Patent is hereby corrected as shown below:

In the specification under column 1, lines 13-15, replace:

~~This invention was made using U.S. Government support under NSF CAREER Grant No. CHE-04500022. The U.S. Government has certain rights in this invention.~~ with This invention was made with government support under CHE0450022 by the National Science Foundation (NSF). The government has certain rights in the invention.

Signed and Sealed this
Thirteenth Day of May, 2014

Michelle K. Lee
*Deputy Director of the United States Patent and Trademark Office*